US012616640B1

(12) United States Patent
Rosomoff

(10) Patent No.: US 12,616,640 B1
(45) Date of Patent: May 5, 2026

(54) CONTAINER HAVING A CONTENTS VOLUME INDICATOR

(71) Applicant: Express Scripts Strategic Development, Inc., St. Louis, MO (US)

(72) Inventor: Peter A. Rosomoff, Wildwood, MO (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 112 days.

(21) Appl. No.: 17/108,350

(22) Filed: Dec. 1, 2020

(51) Int. Cl.
*A61J 1/03* (2023.01)
*A61J 7/02* (2006.01)

(52) U.S. Cl.
CPC .. *A61J 1/03* (2013.01); *A61J 7/02* (2013.01)

(58) Field of Classification Search
CPC .. A61J 1/03; A61J 7/02; B65D 23/006; B65D 23/02; B65D 23/008; B65D 25/02; B65D 25/107; B65D 25/10; B65D 2585/56; B65D 17/503; B76D 81/022; B76D 81/3876
USPC .... 206/534, 540, 528, 529, 535, 459.5, 828, 206/538, 588, 523; 220/528, 529, 506, 220/501
See application file for complete search history.

(56) References Cited

U.S. PATENT DOCUMENTS 2,962,190 A * 11/1960 Horland ............ B65D 83/0409 221/202
3,130,862 A * 4/1964 Lachance ............... B65D 83/04 221/154
3,204,758 A * 9/1965 Horner ............... B65D 83/0481 D9/518
3,821,426 A * 6/1974 Slone ..................... B65D 25/02 426/115
5,201,825 A * 4/1993 Artusi ................... A61F 2/0095 206/523
5,462,171 A * 10/1995 Moog .................. B65D 81/113 428/116
5,749,500 A * 5/1998 Kraus .................... B65D 25/02 222/464.7
5,850,919 A * 12/1998 Freed ................. B65D 83/0481 206/534
6,142,337 A * 11/2000 Schreckenberg ......... A61J 1/03 221/266
6,347,705 B1 * 2/2002 Futrell ...................... A61J 1/03 206/534
6,398,051 B1 * 6/2002 Brozell .................. B65D 51/26 206/828

(Continued)

FOREIGN PATENT DOCUMENTS

CN 2446988 U 9/2001

*Primary Examiner* — Robert Poon
(74) *Attorney, Agent, or Firm* — Dickinson Wright PLLC

(57) ABSTRACT

An aspect of the present disclosure is related to a medication container that includes a receptacle with an interior, a bottom wall, and an open top. A refill indicator is disposed in the interior of the receptacle and in contact with the bottom wall and extends towards the open top. The refill indicator has a top surface. A plurality of pills are disposed in the receptacle, and a pill count of the pills is greater than a predetermined notification pill count such that at least one of the pills contacts the top surface of the refill indicator. The refill indicator is sized and shaped such that the top surface is free of pills when the pill count is at or is less than the notification pill count to notify a user that a refill may be necessary.

12 Claims, 14 Drawing Sheets

(56) References Cited

U.S. PATENT DOCUMENTS

| | | | | |
|---|---|---|---|---|
| 8,061,548 | B1 * | 11/2011 | Peggs | B65D 83/04<br>220/666 |
| 8,068,931 | B2 | 11/2011 | Tran | |
| 9,021,981 | B2 | 5/2015 | Raiti De Boyles | |
| 9,354,098 | B2 * | 5/2016 | Breit | B65D 25/42 |
| 9,808,403 | B2 | 11/2017 | Panzini | |
| 10,360,751 | B2 | 7/2019 | Berg | |
| 10,383,794 | B2 | 8/2019 | Khalid | |
| 2001/0042402 | A1 | 11/2001 | Hoeting | |
| 2005/0150805 | A1 * | 7/2005 | Burchell | B65D 51/28<br>206/533 |
| 2011/0226651 | A1 | 9/2011 | Patino | |
| 2013/0284636 | A1 | 10/2013 | Zhang | |
| 2015/0330823 | A1 * | 11/2015 | Watson | A47G 19/34<br>220/529 |
| 2016/0042150 | A1 | 2/2016 | Moloughney | |
| 2016/0354283 | A1 | 12/2016 | Cho | |
| 2017/0020785 | A1 | 1/2017 | Mccullough | |
| 2017/0083687 | A1 | 3/2017 | Josyula | |
| 2018/0000692 | A1 | 1/2018 | Born | |
| 2019/0333620 | A1 | 10/2019 | Herman | |
| 2020/0024063 | A1 * | 1/2020 | Gadd | B65D 83/0427 |

* cited by examiner

CONTAINER HAVING A CONTENTS VOLUME INDICATOR

FIELD

The present disclosure is related generally to a medication container that can inform a user when a quantity of medications within the container is running low.

BACKGROUND

Patients' failure to follow a prescribed medication regimen is a continuing problem in the health industry. This problem frequently occurs when patients run out of medication before they are able to obtain more, and thus, there is a delay between when the patient runs out of medication and when they are able to purchase and obtain more of the medication.

SUMMARY

An aspect of the present disclosure is related to a medication container that includes a receptacle with an interior, a bottom wall, and an open top. A refill indicator is disposed in the interior of the receptacle and in contact with the bottom wall and extends towards the open top. The refill indicator has a top surface. A plurality of pills are disposed in the receptacle, and a pill count of the pills is greater than a predetermined notification pill count such that at least one of the pills contacts the top surface of the refill indicator. The refill indicator is sized and shaped such that the top surface is free of pills when the pill count is at or is less than the notification pill count to notify a user that a refill may be necessary.

In an example embodiment, the refill indicator is made as a separate piece from the receptacle.

In an example embodiment, the refill indicator is in a snap-fitting engagement with the bottom wall of the receptacle.

In an exemplary embodiment, the refill indicator has an inner wall that surrounds a notification volume that is sized to accommodate no greater than the notification pill count.

In an example embodiment, the top surface is angled downwardly towards the inner wall to guide any pills on the top surface towards the notification volume.

In an example embodiment, the refill indicator has an outer wall that is biased against a sidewall of the receptacle.

In an example embodiment, the refill indicator has an annular shape and has a cut to allow the refill indicator to be compressed when it is inserted through the open top of the receptacle.

In an example embodiment, the refill indicator is shaped and sized such that a volume inside of the receptacle surrounding the refill indicator and between the bottom wall of the receptacle and the top surface is a notification volume that can accommodate no greater than the notification pill count.

In an example embodiment, the refill indicator is spaced inwardly of a sidewall of the receptacle.

In an example embodiment, the notification pill count when the top surface is free of pills is a first notification pill count, and the refill indicator further includes a shoulder that is spaced between the bottom wall of the receptacle and the top surface. The shoulder is free of pills when the pill count is at or less than a second notification pill count that is less than the first notification pill count.

In an example embodiment, the refill indicator and the bottom wall of the receptacle are engaged with one another with at least one spring finger.

Another aspect of the present disclosure is related to a method of filling a medication container. The method includes the step of inserting a refill indicator that has a top surface into an interior of the receptacle. The method proceeds with the step of attaching the refill indicator with a bottom wall of the receptacle. The method continues with the step of filling the receptacle with pills until at least one of the pills at least partially rests against the top surface of the refill indicator.

In an example embodiment, the step of attaching the refill indicator with the bottom wall of the receptacle is a snap-fitting operation.

In an example embodiment, the snap-fitting operation involves snapping at least one spring finger on the receptacle or the refill indicator into a notch on the other of the receptacle and the refill indicator.

Yet another aspect of the present disclosure is related to a system for filling medication containers. The system includes a plurality of receptacles, including at least one type of receptacle and at least one second type of receptacle that is different than the first type of receptacle. The system further includes a plurality of refill indicators, including at least one first type of refill indicator and at least one second type of refill indicator that is different than the first type of refill indicator. The system further includes a refill indicator device that is configured to select and place either of the first and second types of refill indicators into either of the first and second types of receptacles.

In an example embodiment, the refill indicator device is further configured to fixedly attach either of the first and second types of refill indicators with a bottom wall of either of the first and second types of receptacles in a similar manner.

In an example embodiment, the refill indicator device is configured to snap-fit either of the first and second types of refill indicators with either of the first and second types of receptacles.

In an example embodiment, the first type of refill indicator has an annular shape, and the refill indicator device is configured to compress the first type of refill indicator prior to inserting the first type of refill indicator into either the first or second type of receptacle.

In an example embodiment, the first type of refill indicator has an outer wall and an inner wall, and the top surface is angled downwardly from the outer wall to the inner wall.

In an example embodiment, the second type of refill indicator has the shape of a pillar.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

DESCRIPTION OF THE ENABLING EMBODIMENT

Figure 2:
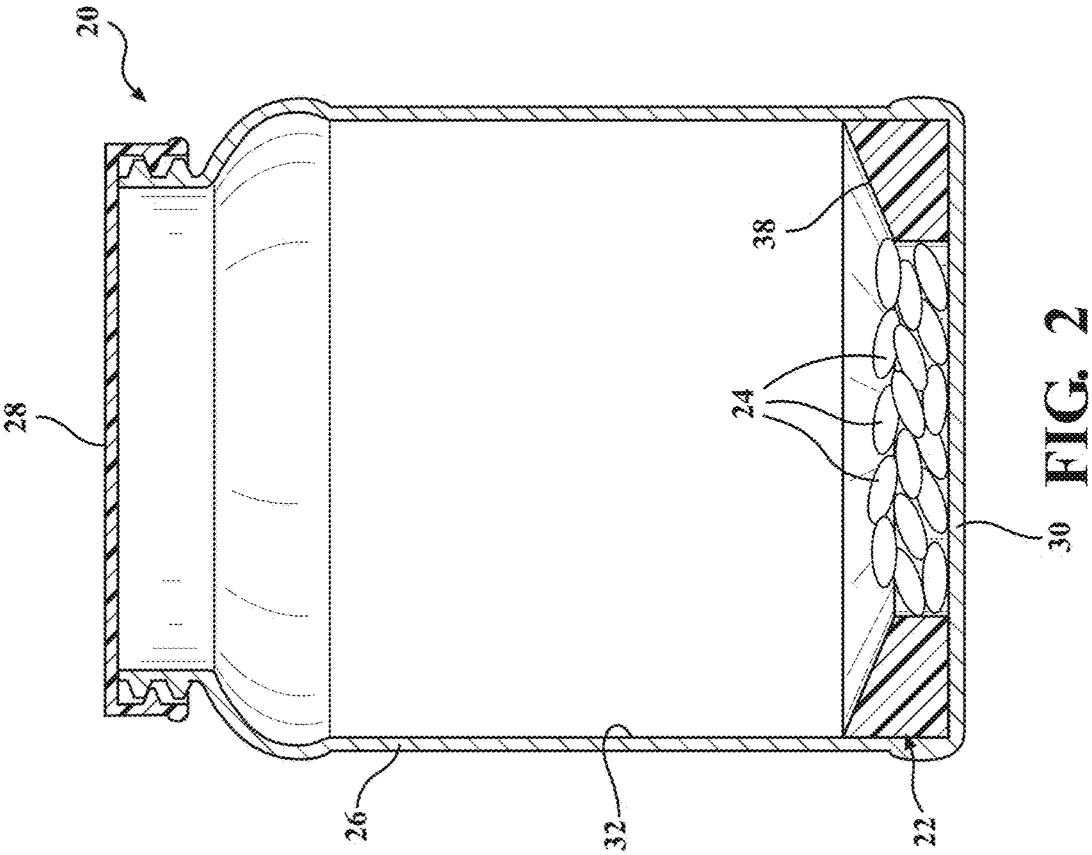
FIG. 2 is a partially cross-sectional view of the medication bottle of FIG. 1 and with a second pill count that is less than the first pill count.
Figure 1:
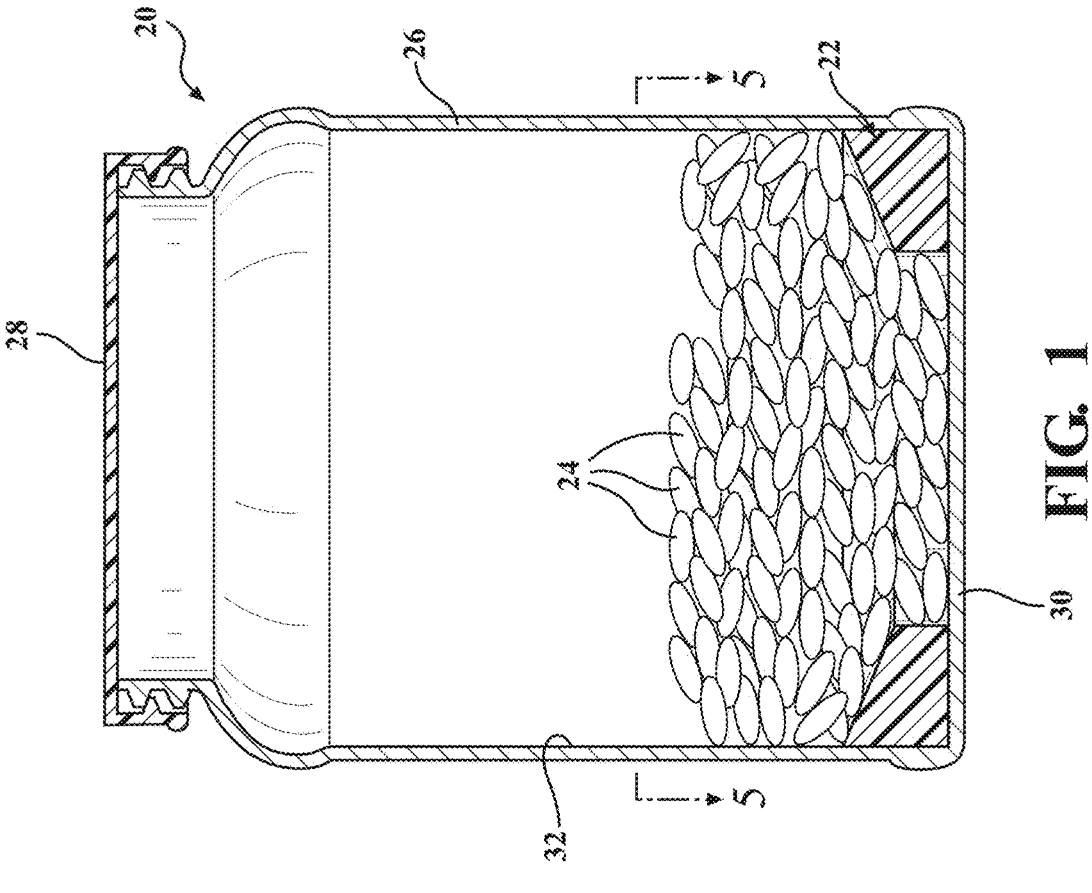
FIG. 1 is a partially cross-sectional view of a medication bottle including a first exemplary embodiment of a refill indicator and with a first pill count.
Figure 5:
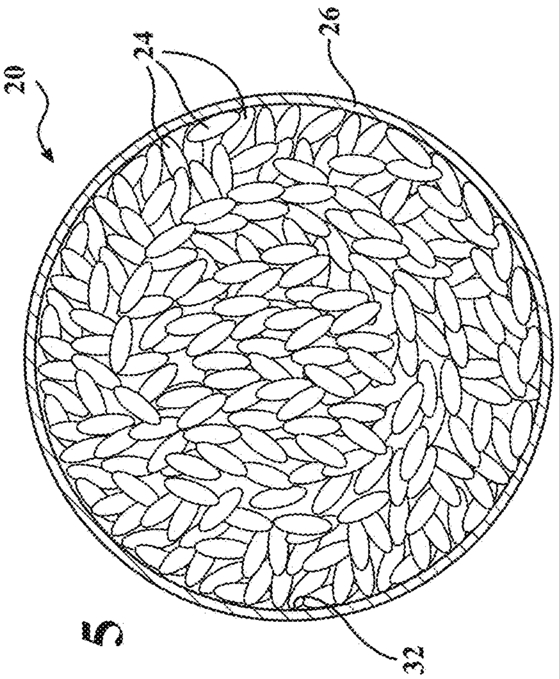
FIG. 5 is another cross-sectional view of the medication bottle of FIG. 1 and with the first pill count.

In general, example embodiments of a medication container with a device that indicates a quantity or volume of contents contained therein are discussed below. When employed in a medication container that includes pills, the device is a volume and/or refill indicator that can notify a user when the user's medication is running low. It has been identified in some cases, that patients run out of medication because they overestimate the contents remaining in their medication container before it runs out. For example, in the case of medication regimens where a daily dose includes two or more pills, even just a seven-day supply of pills in a medication container may appear to be plenty to last for much longer than this time. In other words, short of emptying and individually counting the contents of the medication container, it is often difficult for a patient to determine how much of a medication remains in the patient's medication container. Some embodiments described herein provide a visual notification to the medical professional, patient or other user that medication is running low.

Referring to the Figures, wherein like numerals indicate corresponding parts throughout the several views, one aspect of the present disclosure is related to an improved medication container (such as a bottle 20) that includes a refill indicator 22. As discussed in further detail below, the refill indicator 22 is initially hidden from view by a plurality of pills 24 that surround the refill indicator 22 and only becomes visible when a quantity of the pills 24 in the bottle 20 falls below a predetermined threshold (such as fifteen pills 24 or a two-week supply of pills 24) to inform a user that a refill of the medication contained in the bottle 20 may be necessary. As discussed in further detail below, in various embodiments, the refill indicator 22 may take a range of different forms and may work in a range of different sizes and shapes of bottles 20 or other types of containers. While the medications are frequently hereinafter referred to as pills 24, this term is intended to include many types of solid medications (such as tablets, gel caps, capsules, or the like). In some embodiments, liquid medications or gel-like medications (such as pastes) may even be employed. The medications can have a dry exterior surface such that they remain individual units of medication and can flow with respect to one another.

With reference to FIGS. 1-7, a bottle 20 including a first exemplary embodiment of the refill indicator 22 is generally shown. The bottle 20 comprises two pieces, namely, a receptacle 26 and a cap 28. The cap 28 may be removably attached with the receptacle 26 through any suitable means, e.g., threads or press-fitting. The receptacle 26 is made as a monolithic piece that includes a bottom wall 30 and a sidewall 32 that extends vertically upwardly from the bottom wall 30. The cap 28 is engaged with a top end of the sidewall 32 to selectively open and close an opening of the receptacle 26. The bottom wall 30, sidewall 32, and cap 28 together define an inner space that contains the refill indicator 22 and the pills 24. In this embodiment, the receptacle 26 has a generally cylindrical shape. However, in other embodiments, the receptacle 26 may have other suitable shapes, e.g., a hexagonal shape or a rectangular shape. In some additional shapes there can be two or more sidewalls 32 connected to each other at vertical edges. The receptacle 26 may be made of injection molded or blow molded plastic; however, any suitable material and fabrication process may be employed. The receptacle 26 may also be either translucent or opaque in appearance. The bottom wall 30 supports the pills 24 from below. The sidewall 32 encloses the pills as they are stacked vertically upwardly from the bottom wall 30.

In some embodiments, the quantity of pills 24 that are initially included in the bottle 20 corresponds with a either a predetermined quantity (for example, fifty or one hundred pills 24), a predetermined time (for example, a thirty, sixty, ninety, or an one hundred twenty-day supply of dispensed individual pills 24), or a predetermined number of doses (for example, fifty or one hundred doses). The type and quantity of the pills 24 could either be customized to a specific patient, or the bottle 20 could be a unit-of-use product that is mass produced, e.g., by a pharmaceutical manufacturer, with the same type and quantity of pills 24.

The refill indicator 22 has the form of a pedestal and is disposed in the interior of the receptacle 26 and rests against the bottom wall 30 of the receptacle 26. The bottom surface of the refill indicator 22 is in contact with at least the inner part of the bottom wall 30 or across the bottom wall 30. The refill indicator 22 being against the bottom wall 30 can prevent a pill 24 from traveling underneath the refill indicator 22 between it and the bottom wall 30. In the first embodiment, as viewed from above, the refill indicator 22 has an outer wall 34 with a shape that may match the shape of an inner surface of the sidewall 32 of the receptacle 26 to prevent pills 24 from falling into a gap between the refill indicator 22 and the sidewall 32. In other words, if the sidewall 32 has a square shape, then the outer wall 34 also has a square shape, or if the sidewall 32 has a circular shape, then the outer wall 34 also has a circular shape. The refill indicator 22 also has an inner wall 36 that is spaced inwardly of the outer wall 34 and matches the shape of the outer wall 34. Thus, due to the cylindrical shape of the bottle 20 of the first embodiment, the refill indicator 22 of this embodiment has an annular shape with a circular outer wall 34 and a circular inner wall 36. In an example embodiment, the inner wall 36 and the outer wall 34 have a same shape, but of a different dimension, e.g., larger radius or circumference for the outer wall 34 relative to the inner wall 36. In an example embodiment, the inner wall 36 has a different shape than the outer wall 34, e.g., the outer wall forms a cylinder and the inner wall is a polyhedron or with at least one flat face. The inner wall 36 surrounds a central space that has a cylindrical shape and extends upwardly from the bottom wall 30 of the receptacle 26. A top surface 38 of the refill indicator 22 is angled (i.e., bezeled or tapered) vertically downwardly from the outer wall 34 to the inner wall 36 for guiding pills 24 under the influence of gravity into the central space if the central space has room to fit additional pills 24, i.e., if it is not already filled with pills 24. If the central space is filled, then one or more pills 24 may cover the top surface 38. At least some of the pills 24 are interstitial to the inner wall 36, until the bottle 20 is empty.

The central space that is defined by the inner wall 36 of the refill indicator is specifically sized such that it holds no more than a predetermined number of the types of pills 24 when those pills 24 are in a settled (non-organized) arrangement. The predetermined number of pills 24 that can fit in the central space defined by the inner wall 36 of the refill indicator 22 may correspond with a specific quantity (for example, ten, fourteen or twenty pills 24 remaining). In an example embodiment, the number of pills in the central space may be based on time (for example, a one or two-week supply of pills 24). In an example embodiment, the number of pills remaining may be based on remaining doses (for example, ten, fourteen or twenty doses of pills 24). This predetermined number of pills 24 is hereinafter referred to as a "notification pill count" because, as discussed in further detail below, the refill indicator 22 notifies the user when a pill count in the bottle 20 is at or below this notification pill count. Similarly, the volume of the central space that can accommodate the notification pill count is hereinafter referred to as the "notification volume."

Figure 6:
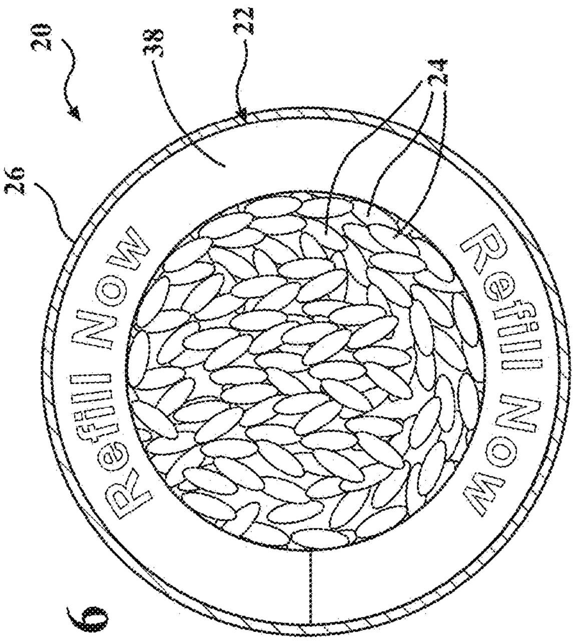
FIG. 6 is another cross-sectional view of the medication bottle of FIG. 1 and with the second pill count.
Figure 3:
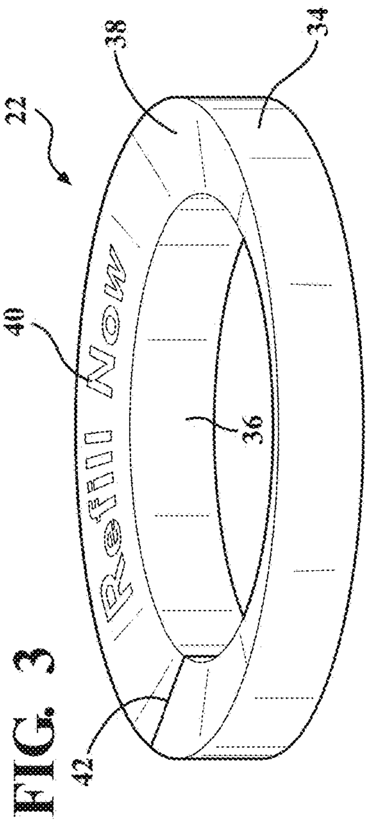
FIG. 3 is a top elevation view of the first exemplary embodiment of the refill indicator.
Figure 4:
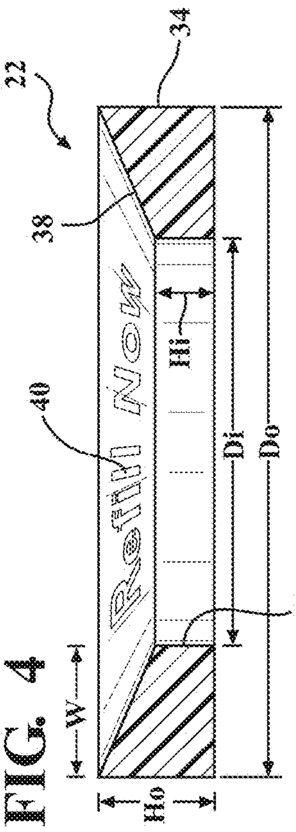
FIG. 4 is a cross-sectional view of the first exemplary embodiment of the refill indicator taken through Line 4-4 of FIG. 3.
Figure 7:
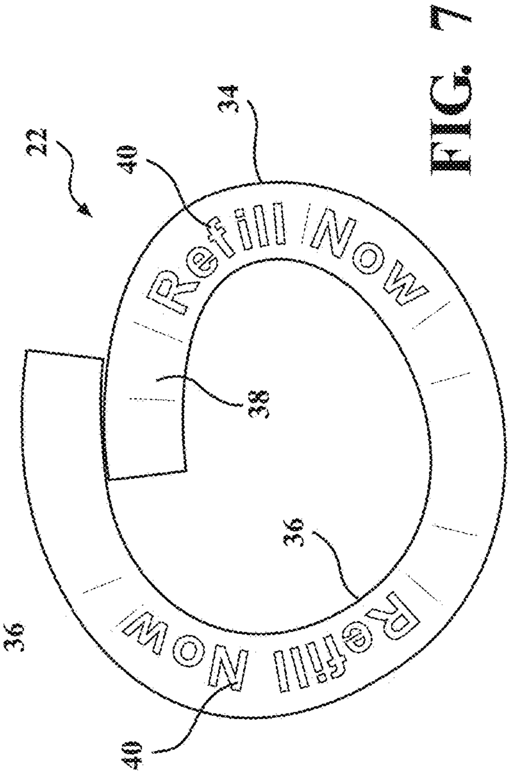
FIG. 7 is a top elevation view showing the first exemplary embodiment of the refill indicator in a compressed condition.

Due to the angled configuration of the top surface 38 of the refill indicator 22, when the pill count in the bottle 20 falls from above the notification pill count to the notification pill count, the top surface 38 will become entirely free of pills 24, albeit very small portions of some pills may in some instances project above small portions of the top surface 38. Therefore, when the pill count is at or below the notification pill count, the top surface 38 will be substantially visible in its entirety to a user looking into the bottle 20 through the opening, as shown in FIG. 6. The top surface 38 being free of pills 24, in and of itself, serves to notify the user that the pill count is at or below the notification pill count. To reinforce this notification to the user, in the exemplary embodiment, the top surface 38 may further include one or more markings, such as an indicia 40 that instructs the user on what to do. In one embodiment, the indicia 40 could provide express instructions to the user, e.g., "Refill Soon When You Can See This Message Completely" or "Call Your Medical Care Provider for a Refill When You Can Read This." In some embodiments, the indicia 40 could be a simpler and more direct message, e.g., "Refill Now" or "14 Doses Remaining." In some embodiments, the marking may take other forms, such as a colored area of the top surface 38, or the entire top surface 38 could be colored.

A label on the bottle 20 may provide a key to the user on what the color on the refill indicator 22 means. The label can be the label applied to the outside of the prescription bottle by a pharmacy, e.g., an automated, high volume pharmacy. The label can have a "refill now" notification printed on the label in the same color as the top surface 38 on the refill indicator 22. An example of a label that can be used in the present disclosure is described in U.S. patent application Ser. No. 16/209,701, titled SYSTEMS AND METHODS FOR TARGETED INTERVENTION AND COMMUNICATIONS WITH PATIENT, which is hereby incorporated by reference for any purpose. In an example, the intervention message on the label can be color coded with the refill indicator 22

In the first embodiment, the refill indicator 22 is made as a monolithic piece of a resiliently deflectable material and has a single diagonal cut 42 that extends all the way through the refill indicator 22. The cut 42 allows the refill indicator 22 to be compressed (see FIG. 7), thereby temporarily reducing its outer diameter to allow the refill indicator 22 to be fit through the narrow opening of the receptacle 26 during an insertion process. Once the refill indicator 22 passes through the opening and into the interior of the bottle 20 and is moved against the bottom wall 30, the refill indicator 22 springs outwardly to press outwardly against the sidewall 32 of the receptacle 26 and remain in position against the bottom wall 30. In other words, when in an unstressed condition, the refill indicator 22 has an outer diameter that is slightly greater than an inner diameter of the sidewall 32. Thus, when the refill indicator 22 is disposed in the receptacle 26, it self-presses itself against the sidewall 32, thereby establishing a tight-fit relationship between the refill indicator 22 and the receptacle 26.

In one embodiment, a machine, which may be located in a pharmaceutical setting, can automatically compress the refill indicator 22, move it into position against the bottom wall 30 of the receptacle 26 and release it then proceed very quickly to do the same with another refill indicator 22 and another receptacle 26. In another embodiment, the refill indicator 22 may be manually compressed and inserted into the receptacle 26. In yet another embodiment, the refill indicator 22 could be monolithic (i.e., as a single, seamless piece) with the receptacle 26, thereby obviating the need for an insertion process. In both examples, the refill indicator 22 is bent less than its bending angle to ensure that it will springback to its intended shape against the walls of the receptacle 26. That is, the material of the body of the refill indicator 22 is selected to have the springback properties necessary to be bent to fit through the open top of the receptacle 26 and springback to press against the receptacle wall beneath the open top.

The refill indicator 22 is specifically sized and shaped such that the notification volume (i.e., the volume encircled by the inner wall 36 and extending axially from the bottom wall 30 of the receptacle 26 to the top surface 38 of the refill indicator 22) can hold no more than the notification pill count. To accomplish this, the size and shape of the refill indicator 22 must be specifically determined. The size of the notification volume is dependent on, at least the sizes and the shapes of the pills 24. The shapes of the pills 24 will contribute to any white (empty) space that will naturally fit between the pills 24 when the pills are sitting in the notification volume in a loose/unorganized manner. In other words, the calculated size of the notification volume accounts for a range of voids that are statistically created by a specific quantity of pills 24 or other dry constructions that do not flow and any portions of the pills 24 that are partially within the notification volume and partially project above the notification volume. Thus, the exact size and shape of the refill indicator 22 are dependent on at least the following factors: (1) the shape of the receptacle 26, (2) the size of the receptacle 26, (3) the notification pill count, (4) the sizes of the pills 24, and (4) the shapes of the pills 24.

In the exemplary embodiment, the size and shape of the refill indicator 22 can be chosen by selecting or otherwise adjusting, for example, any of its outer diameter $D_0$, its inner diameter $D_I$, the height $H_O$ of the outer wall, the height $H_1$ of the inner wall 36, and a radial width W of the refill indicator 22 to customize the notification volume to fit a desirable notification pill count with any types of pills 24. The difference between the heights $H_0$ and $H_I$ is preferably selected such that the top surface 38 is angled at a sufficient angle to guide any pills 24 that might be located thereon into the notification volume. In one embodiment, the top surface 38 is angled at a range of between fifteen and forty-five degrees (15°-45°). In another embodiment, the top surface 38 is angled at a range of between twenty-five and thirty-five degrees (25°-35°).

Figure 9:
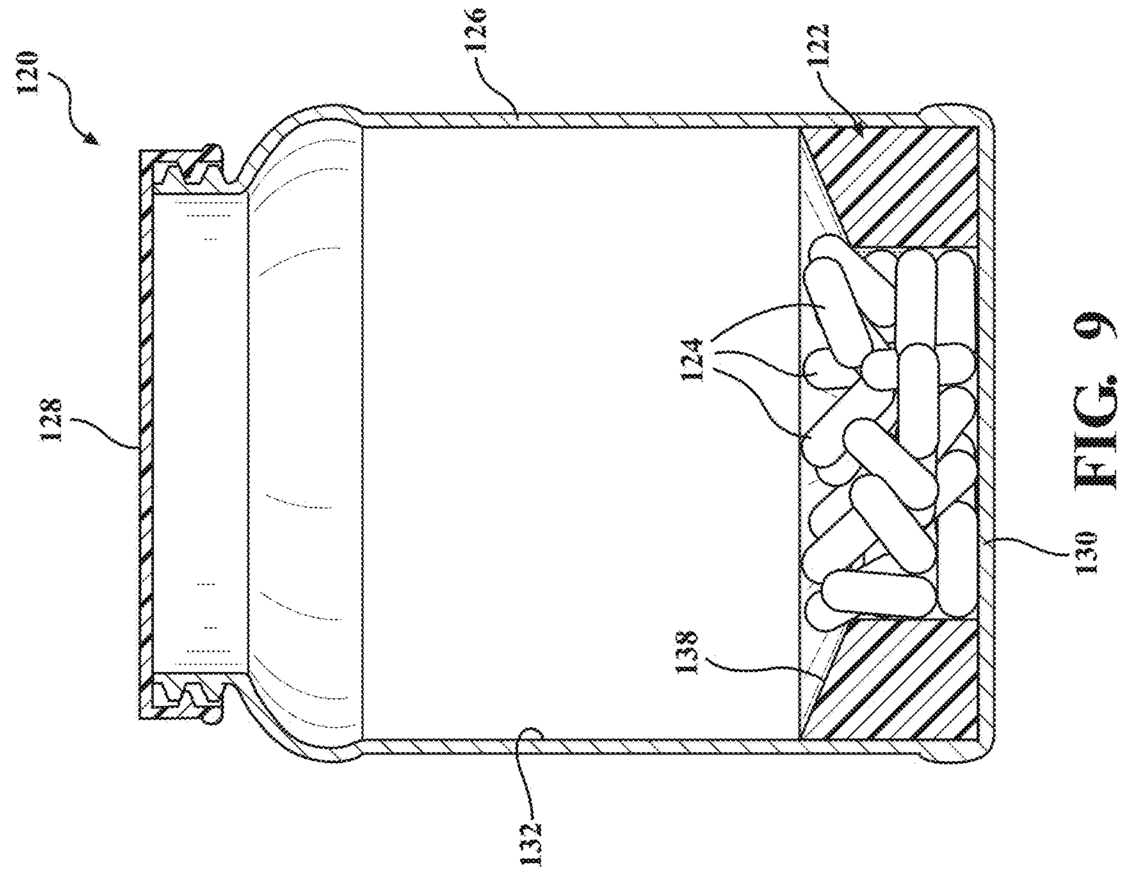
FIG. 9 is a partially cross-sectional view of the medication bottle of FIG. 8 and with a second pill count that is less than the first pill count.
Figure 8:
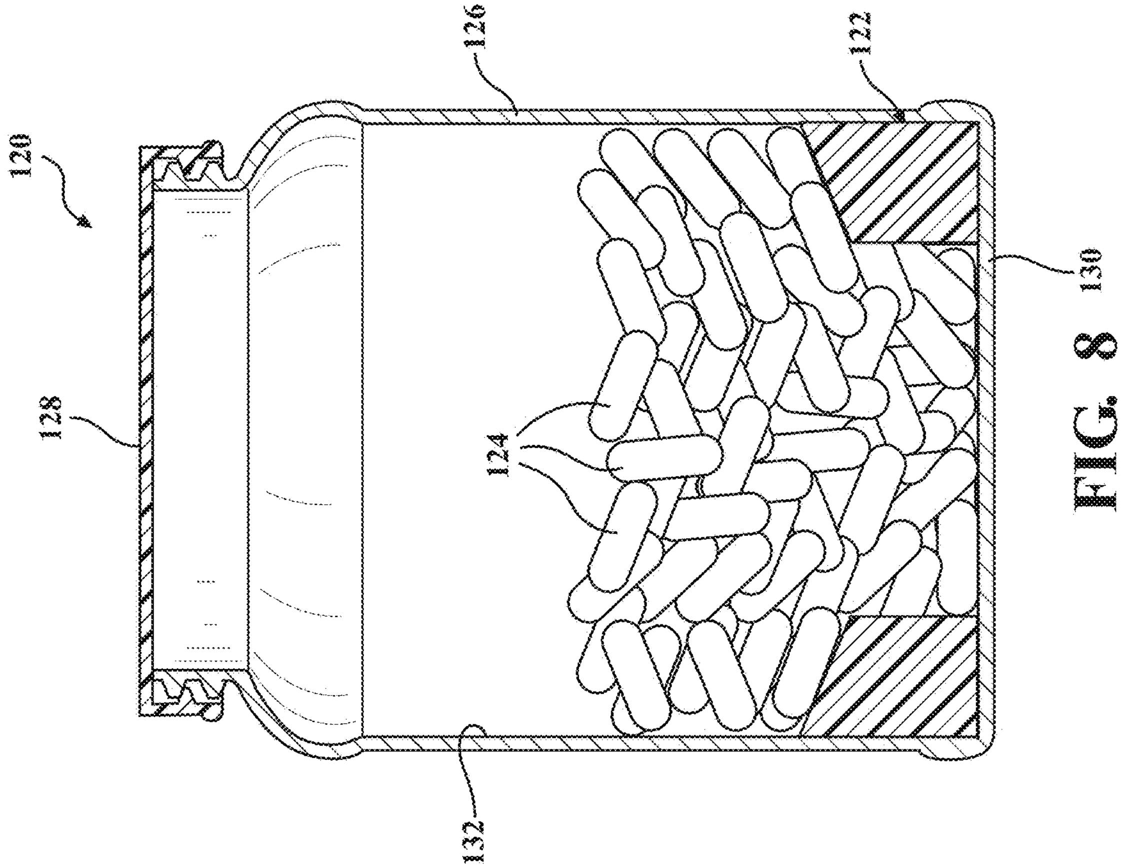
FIG. 8 is a partially cross-sectional view of a medication bottle including a second exemplary embodiment of the refill indicator with a first pill count.
Figure 11:
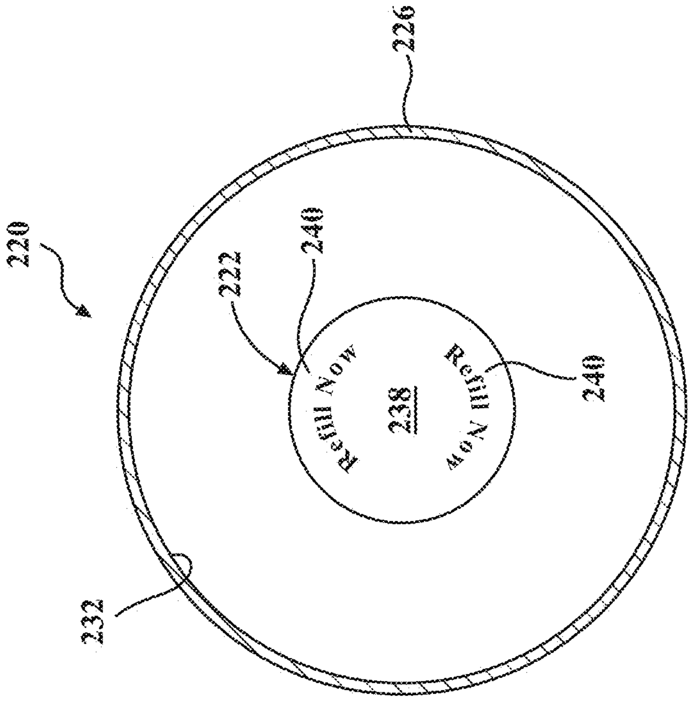
FIG. 11 is another cross-sectional view of the medication bottle of FIG. 10 taken through Line 11-11 of FIG. 10.
Figure 10:
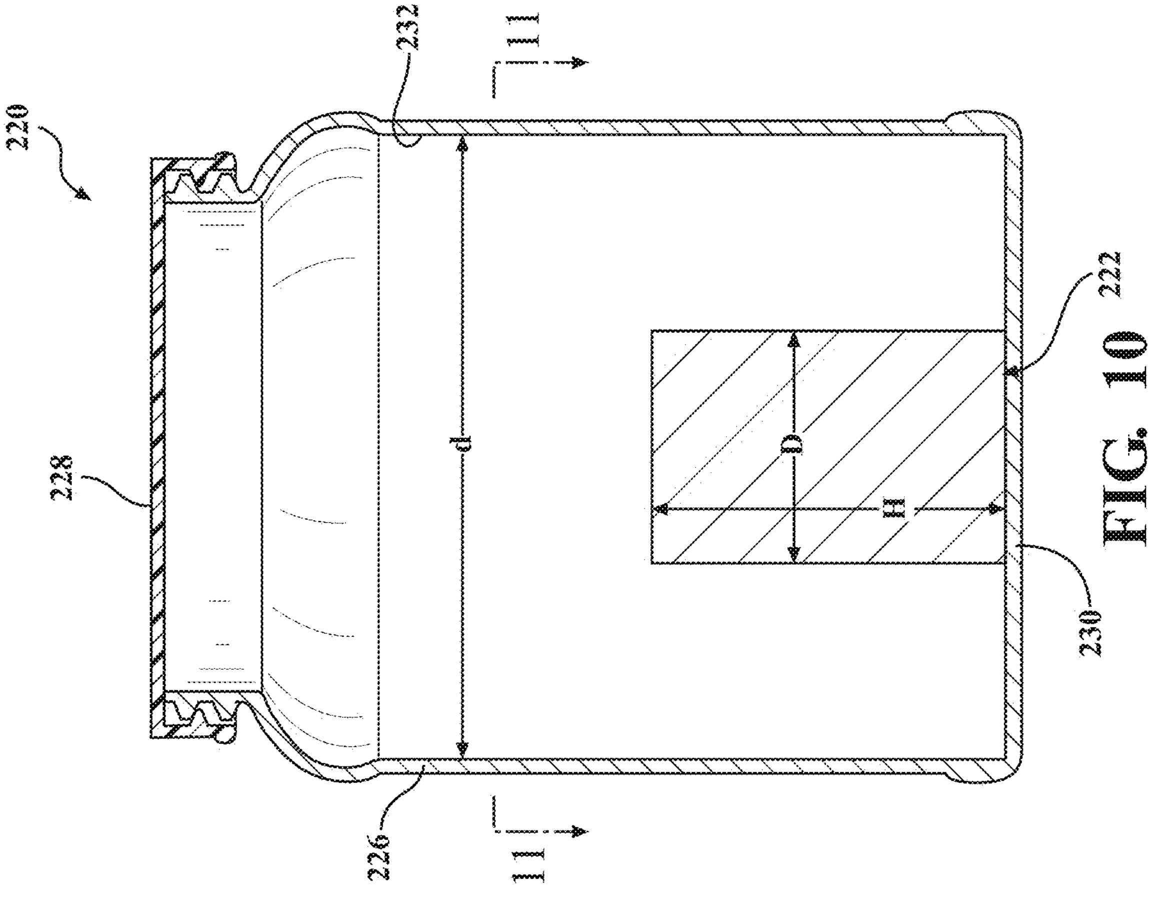
FIG. 10 is a cross-sectional view of a medication bottle including a third exemplary embodiment of the refill indicator.
Figure 13:
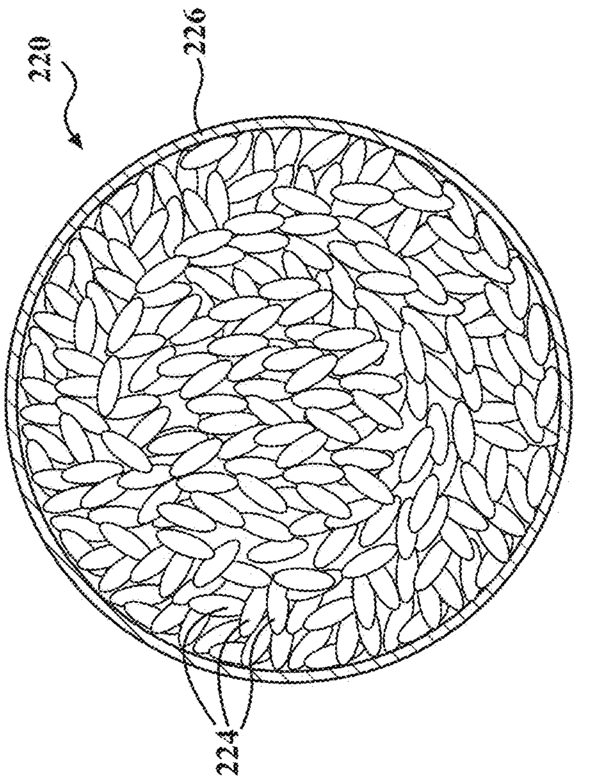
FIG. 13 is another cross-sectional view of the medication bottle of FIG. 10 and showing the medication bottle containing the first pill count.
Figure 12:
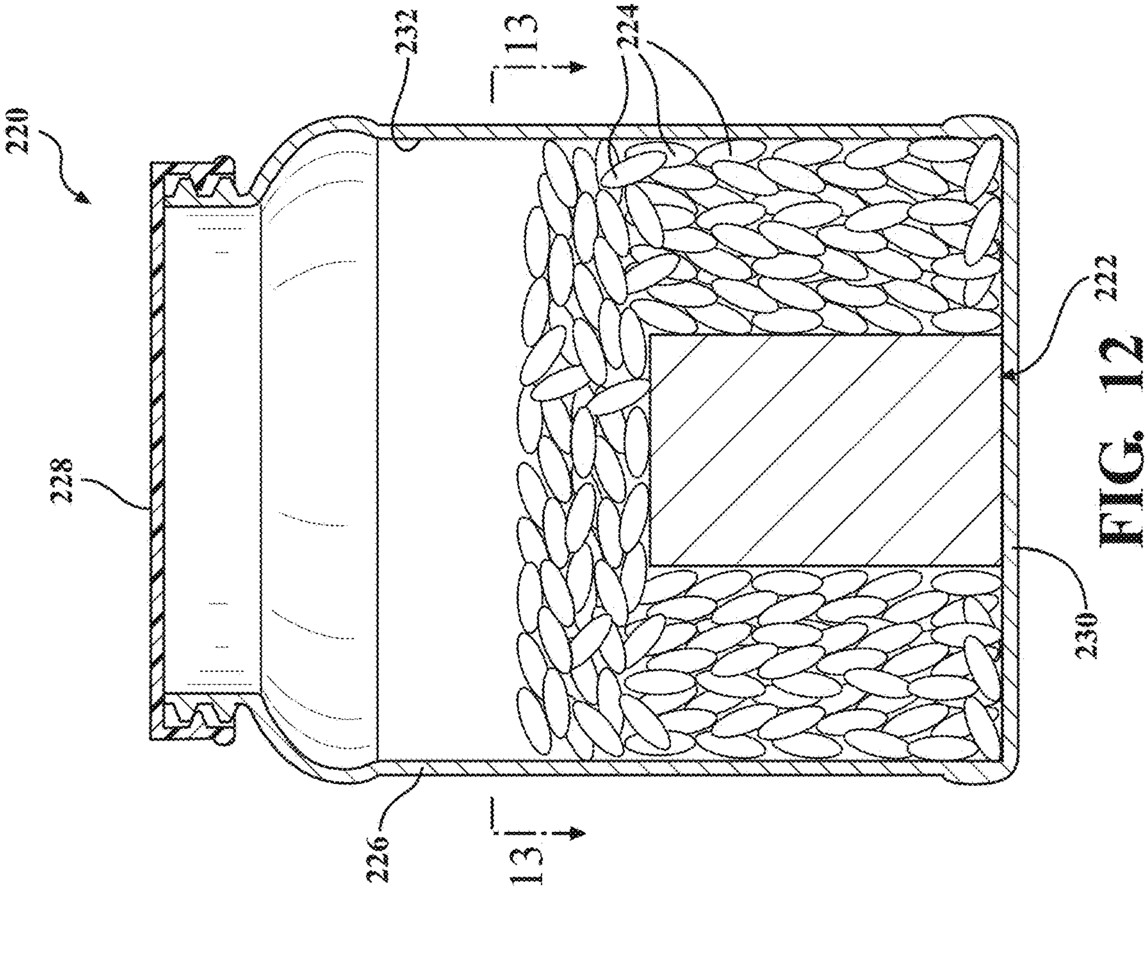
FIG. 12 is another cross-sectional view of the medication bottle of FIG. 10 and showing the medication bottle containing a first pill count.
Figure 15:
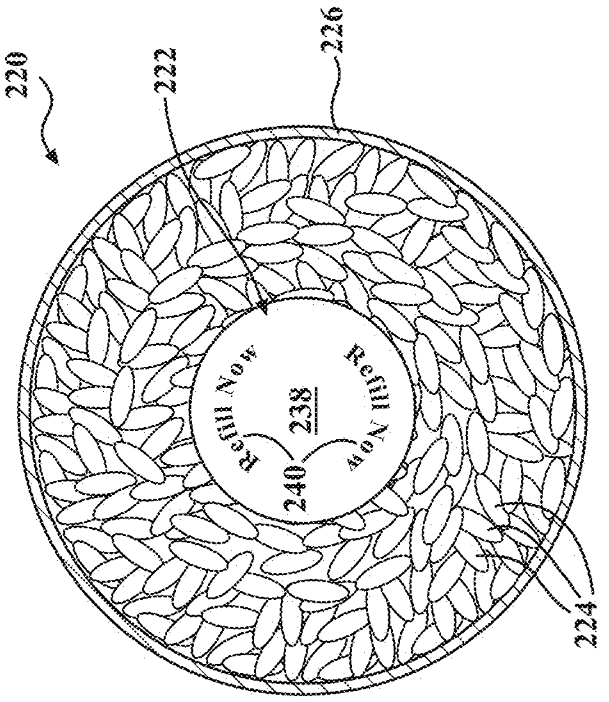
FIG. 15 is another cross-sectional view of the medication bottle of FIG. 10 and showing the medication bottle containing the second pill count.
Figure 14:
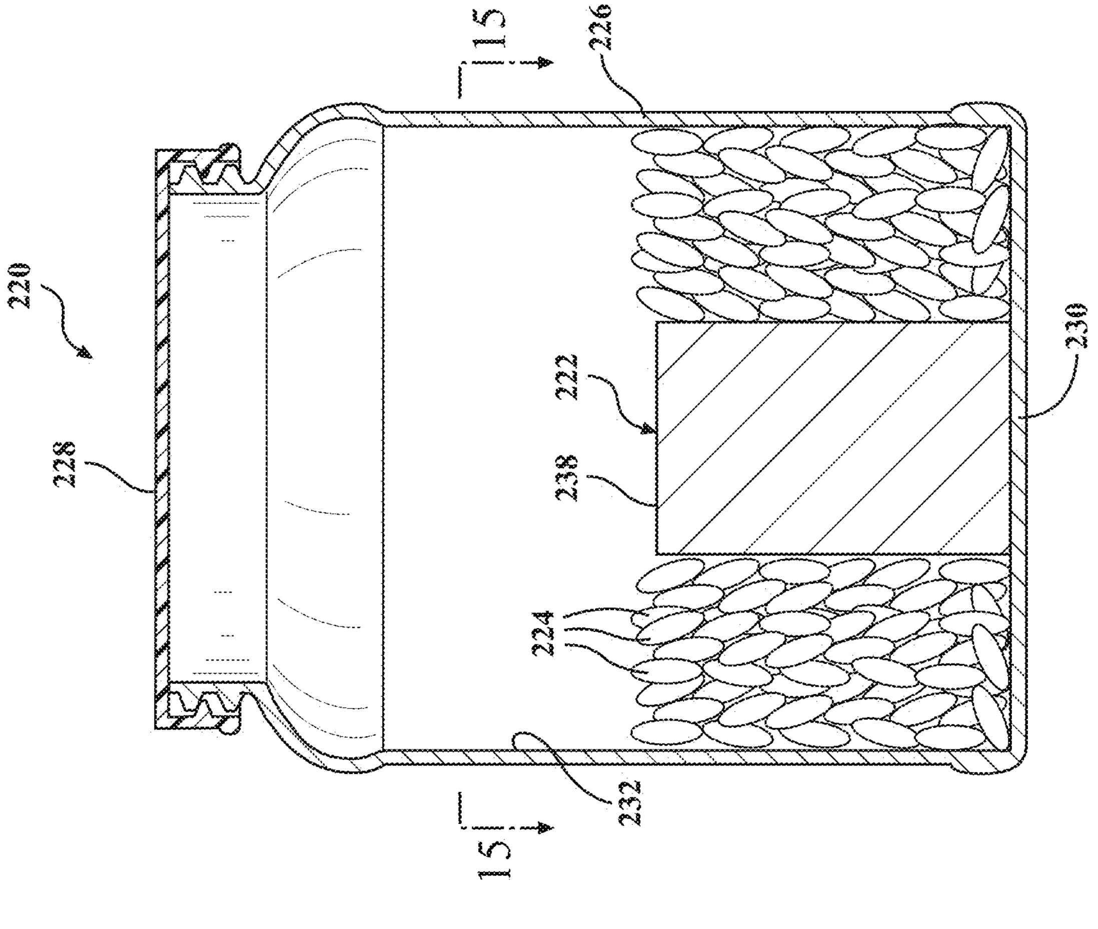
FIG. 14 is another cross-sectional view of the medication bottle of FIG. 10 and showing the medication bottle containing a second pill count that is less than the first pill count.

Referring now to FIGS. 8 and 9, a second exemplary embodiment of the refill indicator 122 is generally shown with like numerals, separated by a prefix of "1," identifying corresponding parts with those described above. In this embodiment, the pills 124 are larger and differently shaped than those in the first embodiment, but the notification pill count is the same. Accordingly, the refill indicator 122 in this embodiment is shaped differently than the one described above to increase the notification volume to accommodate the same number of larger and differently sized pills. Other embodiments may have differently sized and shaped refill indicators to accommodate differently shaped and sized pills and to accommodate different notification pill counts.

Referring now to FIGS. 10-15, a third exemplary embodiment of the refill indicator 222 is shown with like numerals, separated by a prefix of "2," identifying corresponding parts with the parts described above. In this embodiment, the refill indicator 222 is an island-style refill indicator 222 that is fixedly attached with a central location of the bottom wall 230 and rises vertically upwardly from the bottom wall 230 with the shape of a pillar. The pillar 222 can have a solid outer wall and a top wall with the top surface 238 upwardly spaced from the bottom wall 230 of the receptacle 226. In contrast to the above-described embodiment, which is pressed against the sidewall of the receptacle to stay in place against the bottom wall 230, the refill indicator 222 does not contact the sidewall 232. Therefore, in this embodiment, the refill indicator 222 is fixedly attached directly with the bottom wall 230, such as with an adhesive; however, other suitable attachment means could alternately be employed including, for example, ultrasonic fusion. As discussed in further detail below, in some embodiments, the refill indicator may be mechanically snap-fit into engagement with the bottom wall of the receptacle or may not be fixedly attached with the bottom wall at all.

In this embodiment, the marking (for example, an indica 240 or a colored portion) is disposed on the top surface 238 to notify the user that the pill count in the bottle 20 is at or below the notification pill count when the top surface 238 is free of pills 224 and visible from above, e.g., through the open top of receptacle. In some embodiments, the top surface 238 may be angled, conical, frustopyramidal or frustoconical in shape such that any pills 224 that on the top surface 238 are urged into the space surrounding the refill indicator 222 if there is enough room in that space to accommodate the pills 224.

In this embodiment with the island-style refill indicator 222, the notification volume is the space inside the receptacle 226 that surrounds the refill indicator 222 and that is between the bottom wall 230 of the receptacle 226 and the top surface 238 of the indicator 222. Thus, this embodiment is the invert of the one described above in that the notification volume surrounds the refill indicator 222 rather than the other way around as is the case in the first and second embodiments described above with reference to FIGS. 1-7.

An equation can be derived to calculate one or more dimensions of the refill indicator 222 to achieve a desirable notification volume. Such an equation sets the notification volume equal to the total volume of the receptacle 226 vertically below the top surface 238 of the refill indicator 222 minus the volume of the refill indicator 222. For example, in this exemplary embodiment, receptacle 226 has a cylindrical shape with a sidewall 232 that has a diameter d, and the refill indicator 222 has a cylindrical shape with a diameter D and a height H. The following equation can then be used to determine an appropriate diameter D and height H for the refill indicator 222, with V representing the desired notification volume.

$$V = H\pi\left(\left[\frac{d}{2}\right]^2 - \left[\frac{D}{2}\right]^2\right)$$

Using this equation, V and d are known constants. Either the diameter D or the height H of the refill indicator 222 can be chosen, and the other can be solved for. The specific equation for determining the size of the refill indicator 222 will vary based on the shapes of the refill indicator 222 and the receptacle 226. A server as part of a pharmacy can be used to calculate the volume as it will have the size and shape of the pills 224.

Figure 16B:
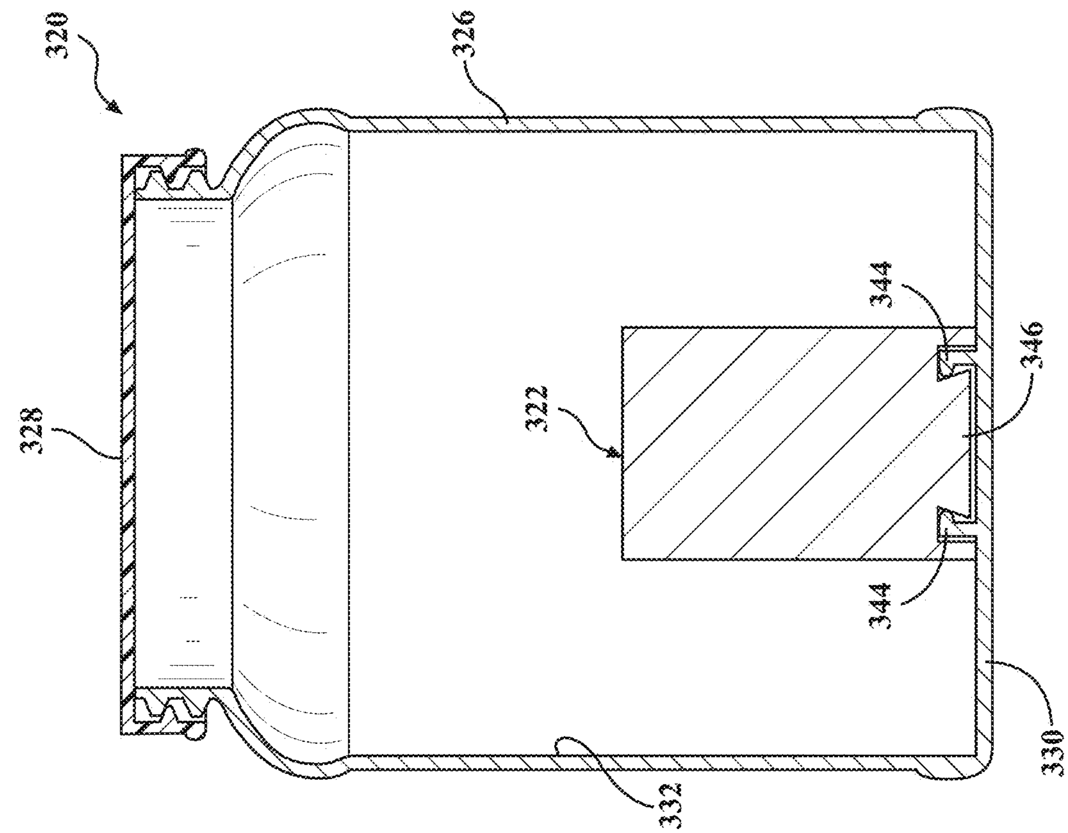
FIG. 16B is another exploded and cross-sectional view of the medication bottle of FIG. 16A and including a fourth exemplary embodiment of the refill indicator but of a different size than the one shown in FIG. 16A.
Figure 16A:
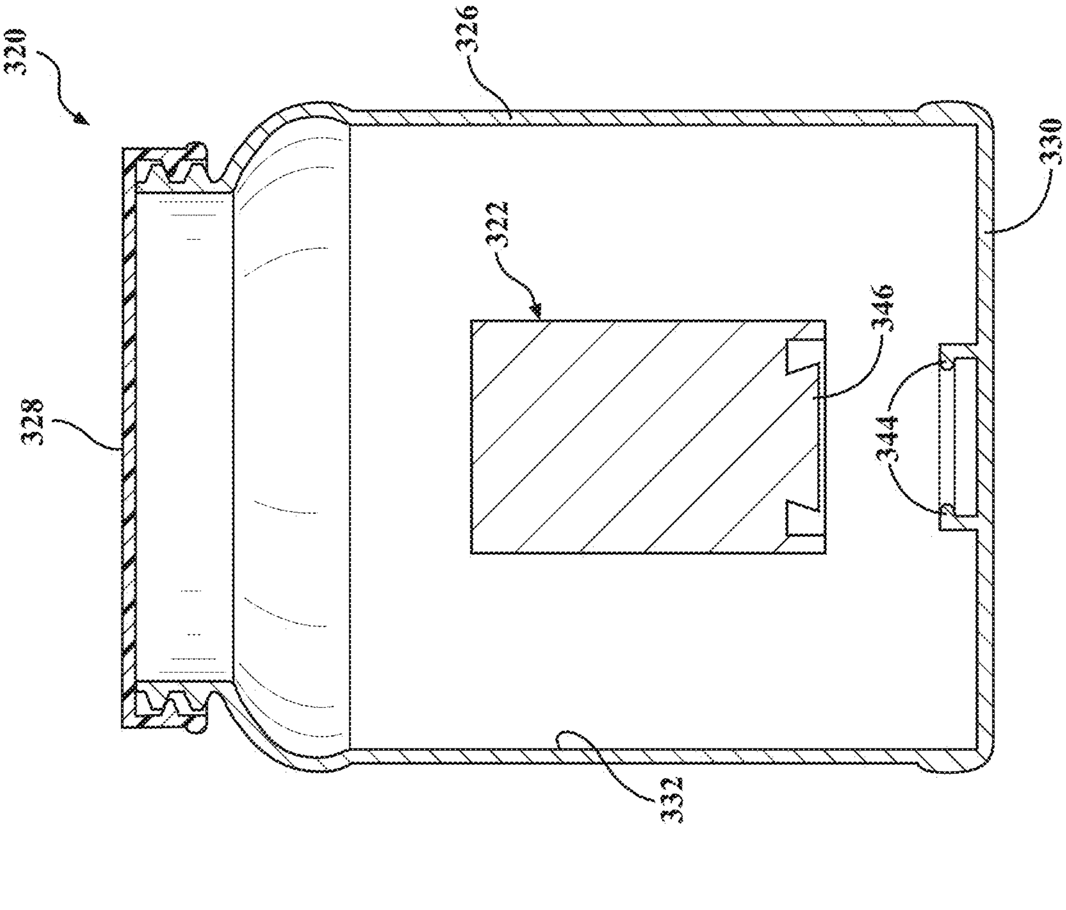
FIG. 16A is an exploded and cross-sectional view of a medication bottle including a fourth exemplary embodiment of the refill indicator.

Referring now to FIGS. 16A and 16B, a fourth exemplary embodiment of the refill indicator 322 is generally shown with like numerals, separated by a prefix of "3," identifying corresponding parts with the parts described above. In this embodiment, the bottom wall 330 of the receptacle 326 includes at least one spring finger 344 with a radially inward projection. The refill indicator 322 has a bottom surface with a projection 346 that includes a notch which is shaped to receive the at least one spring finger 344. The refill indicator 322 can be attached with the receptacle 326 by urging the projection 346 downwardly to deflect the at least one spring finger 344 outwardly until the at least one spring finger 344 snaps into engagement with the projection 346, thereby establishing a detachable but durable connection between the refill indicator 322 and the receptacle 326. This connection can be made very quickly and efficiently, such as on an assembly line. In the exemplary embodiment, the refill indicator 322 may be in any rotational orientation relative to the receptacle 326, thereby making the installation process easier than if a certain rotational orientation was required.

In an example embodiment, the male connector and female connector in the FIG. 16A, 16B embodiment can be reversed such that the notch is integral with the bottom wall of the receptacle and the fingers are on the refill indicator. In an example embodiment, the finger is an arcuate shape that extends at least half way around the bottom wall of the refill indicator. In another example embodiment, the finger includes at least two or more sub-fingers that engage the notch.

It is also within the scope of the present disclosure to modify the first and second embodiments to include a similar press fit or bayonet connection to fix the refill indicator 22, 122 to the bottom wall of the receptacle as described with reference to FIGS. 16A and 16B.

The fourth embodiment may allow the same receptacle 326 to be used with a range of different refill indicators 322 or vice versa, thereby allowing for manufacturing cost savings through economies of scale. Thus, multiple different receptacles 326 having different sizes and/or shapes can be used with multiple different refill indicators 322 having different shapes and/or sizes to customize for each order a desirable notification volume by selecting and joining the appropriate receptacle 326 and refill indicator 322 and joining them together through the same process.

Figure 18:
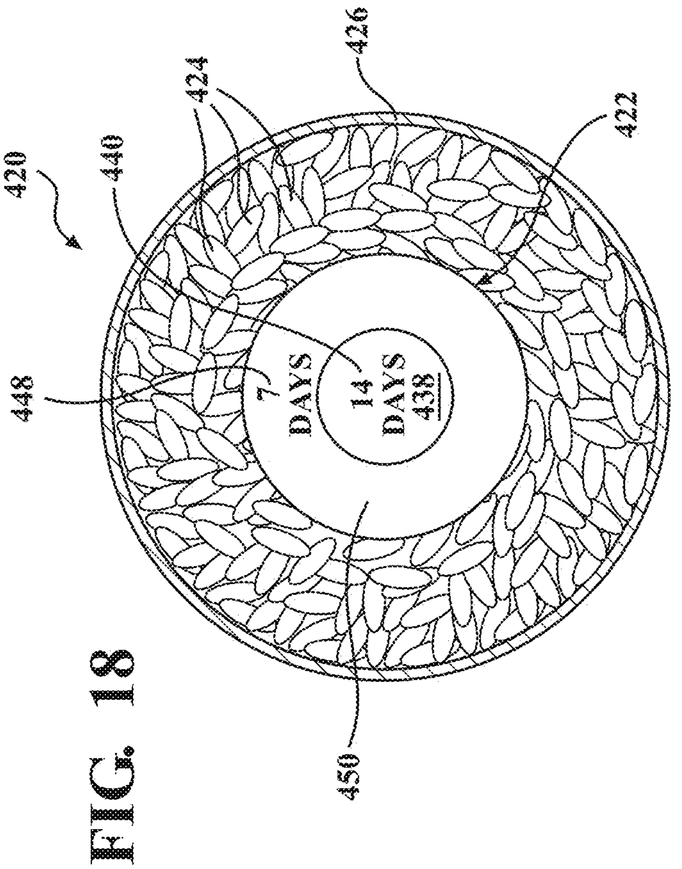
FIG. 18 is another cross-sectional view of the medication bottle including the fifth exemplary embodiment of the refill indicator taken through Line 18-18 of FIG. 17.
Figure 17:
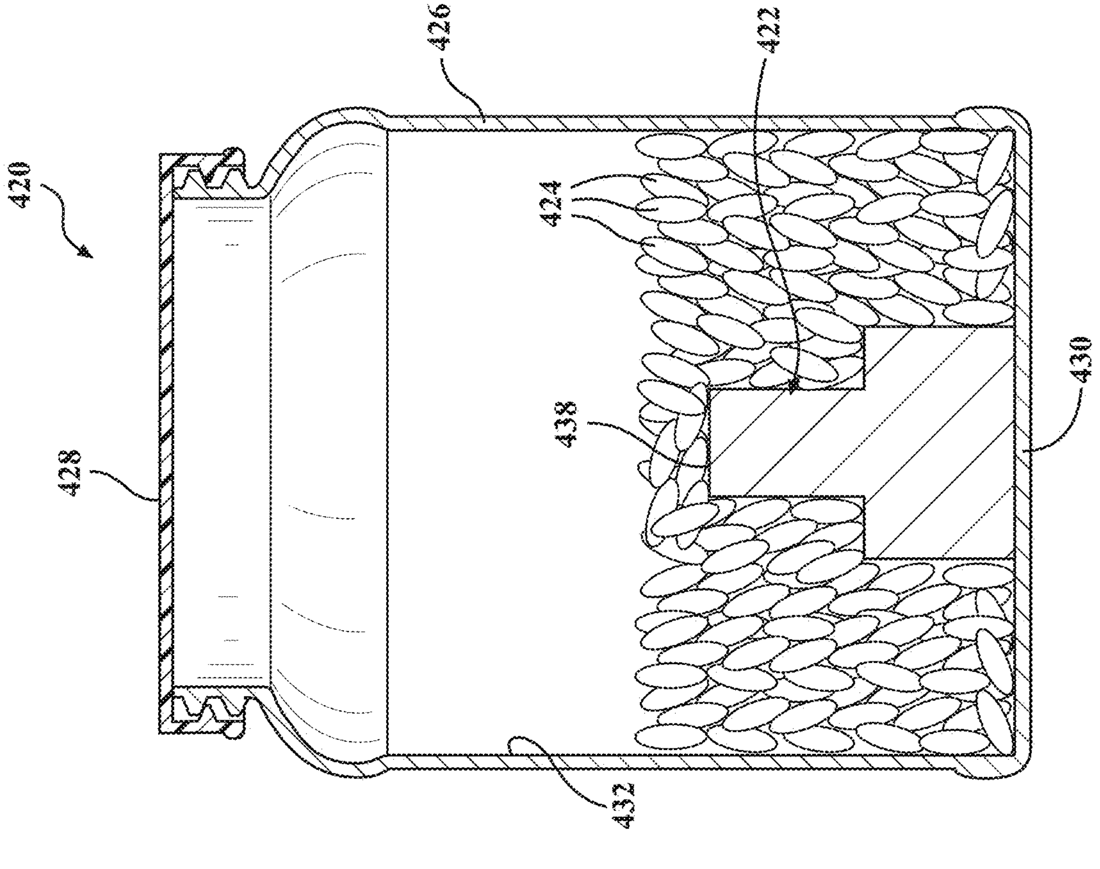
FIG. 17 is a cross-sectional view of a medication bottle including a fifth exemplary embodiment of the refill indicator.

Referring now to FIGS. 17 and 18, a fifth exemplary embodiment of the refill indicator 422 is generally shown with like numerals, separated by a prefix of "4," identifying corresponding parts with the parts described above. In this embodiment, the refill indicator 422 is tiered to display two different reminders to the user, namely, a first reminder when the quantity of pills 424 in the bottle 420 falls to a first notification pill count and a second reminder when the quantity of pills 424 in the bottle 420 falls to a second (lower) notification pill count. The first reminder is a marking (such as a first indicia 440) located on a circular top surface 438 of the refill indicator 422, and the second reminder is a marking (such as a second indicia 448) located on a shoulder 450 that is recessed below the top surface 438. In the exemplary embodiment, the first notification pill count may be associated with a fourteen-day supply of pills 424, and the second notification pill count may be associated with a seven-day supply of pills 424. In other embodiments, the first and second refill reminders can be associated with different pill counts (e.g., ten and twenty pills remaining or ten and twenty doses remaining).

In the fifth embodiment, the refill indicator 422 creates a first notification volume and a second notification volume. The first notification volume is the space within the receptacle 426 surrounding the refill indicator 422 and being disposed vertically between the bottom wall 430 and the shoulder 450. The second notification volume is the space within the receptacle 426 surrounding the refill indicator 422 and disposed vertically between the shoulder 450 and the top surface 438. Thus, the first notification volume encompasses all of the second notification volume.

Figure 19:
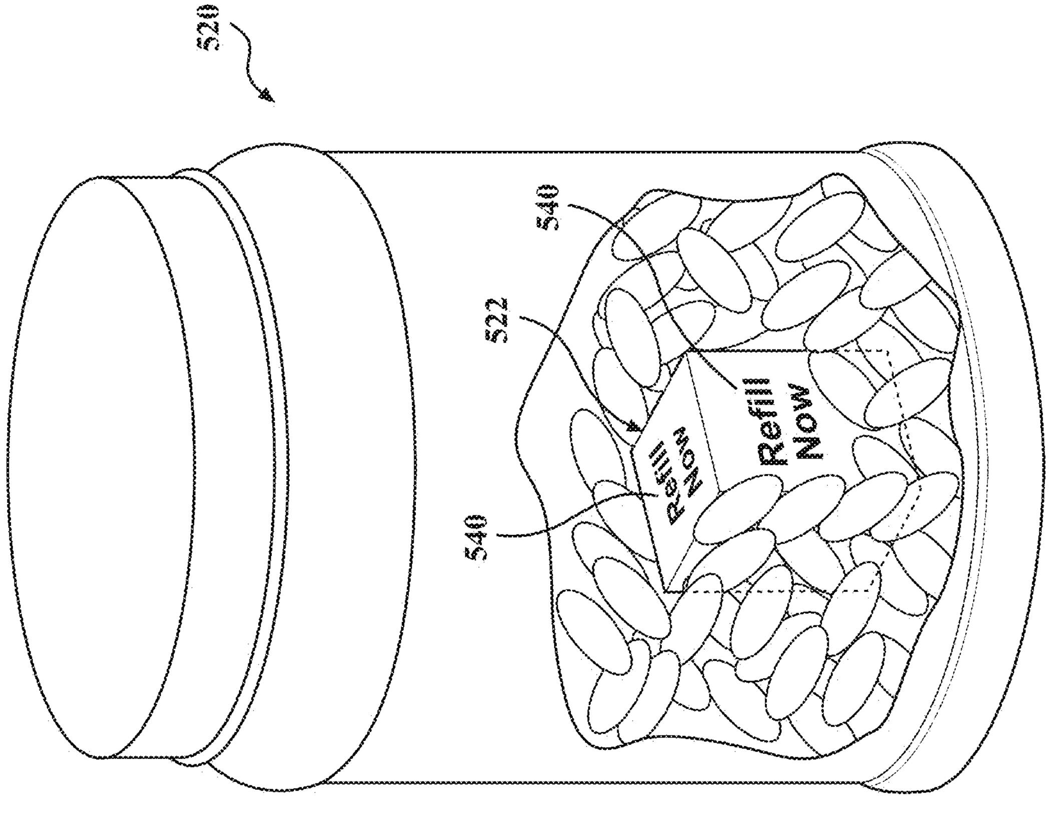
FIG. 19 is a perspective and partially sectional view of a medication bottle including a sixth exemplary embodiment of the refill indicator.

Referring now to FIG. 19, a sixth exemplary embodiment of the refill indicator 522 is generally shown with like numerals, separated by a prefix of "5," identifying corresponding parts with the parts described above. In this embodiment, the refill indicator 522 is cube-shaped and is not fixedly attached with the bottom wall 530 of the receptacle but rather rests thereon. Each of the six surfaces on the cube-shaped refill indicator 522 includes a marking (such as indicia 540 that says "Refill Now") that is designed to notify the user that the quantity of pills 524 in the bottle 520 is at or below the notification pill count. Thus, the refill indicator 522 is functional regardless of which side surface faces upwardly. The refill indicator 522 is preferably made of a material that is more dense than the pills 524 such that if the refill indicator 522 is not resting against the bottom wall 530 of the receptacle 526, agitating the bottle 520 can cause the refill indicator 522 to fall towards the bottom wall 530 and then remain on the bottom wall 530 thereafter.

Figure 20:
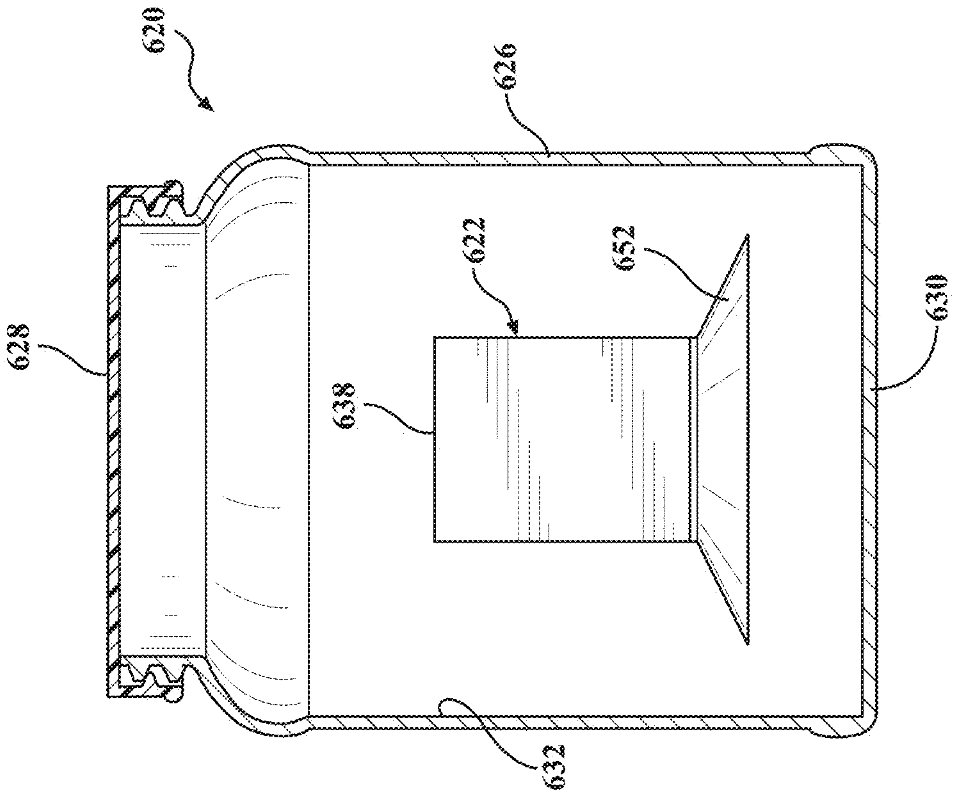
FIG. 20 is a cross-sectional and exploded view of a medication bottle including a seventh exemplary embodiment of the refill indicator.

Referring now to FIG. 20, a seventh exemplary embodiment of the refill indicator 622 is generally shown with like numerals, separated by a prefix of "6," identifying corresponding parts with the parts described above. In this embodiment, the refill indicator 622 has a similar shape to the refill indicator 222 of the third embodiment that is discussed above and is shown in FIGS. 10-15 but further includes a suction device 652 affixed to its bottom surface and that is configured to fixedly attach with the bottom wall 630 of the receptacle 626 with a suction force. Specifically, the suction device 652 is made of a flexible material, such as rubber or a rubber-like material, and has a conical shape. During an installation procedure, the suction device 652 is pressed against the bottom wall 630, and air confined between the suction device 652 and the bottom wall 630 is evacuated from this space, thereby creating a pressure differential between outside and inside of this space between the suction device 652 and the bottom wall 630. Thus, in this embodiment, the refill indicator 622 can be installed into the receptacle 626 in a very quick and easy manner without the need for adhesives or mechanical fasteners.

Figure 22:
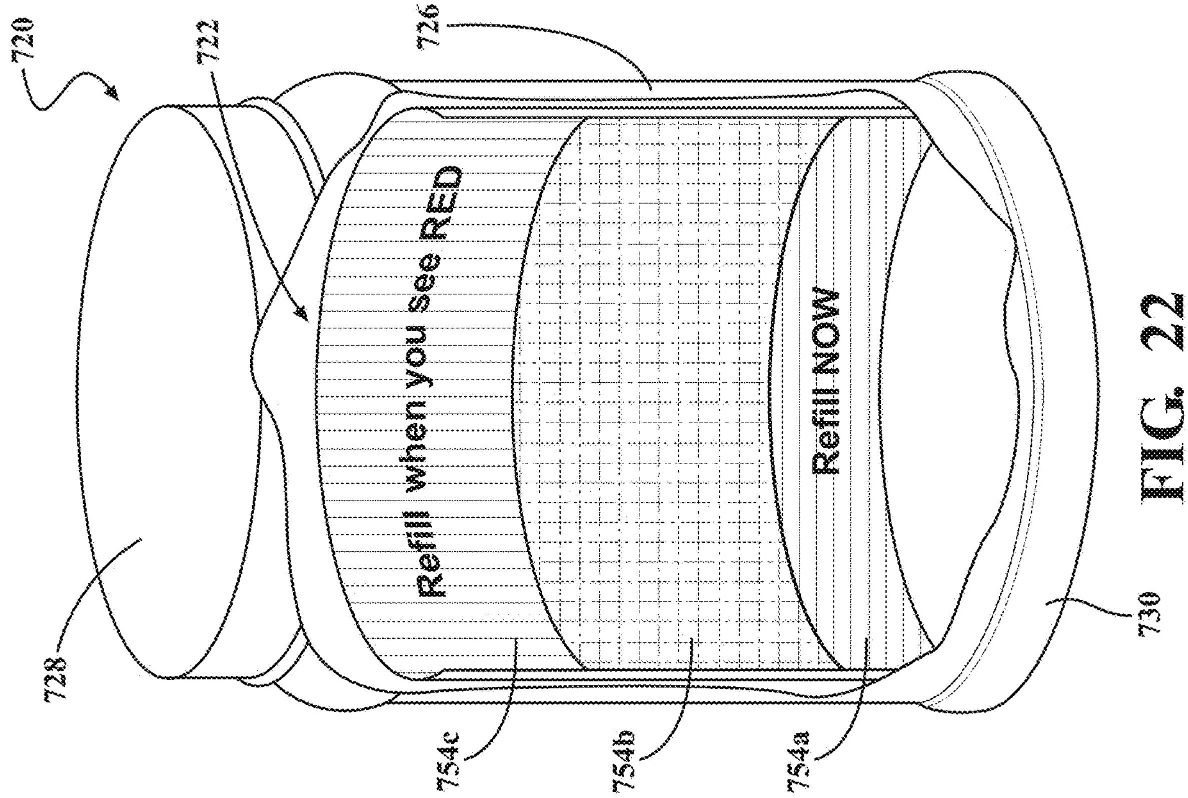
FIG. 22 is a cross-sectional view of a medication bottle including the eighth exemplary embodiment of the refill indicator.
Figure 21:
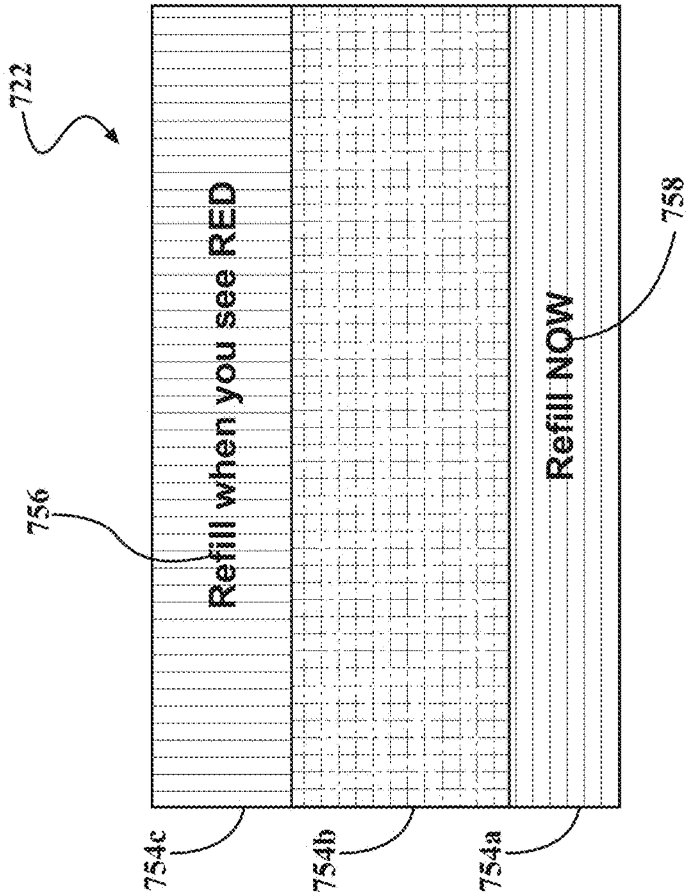
FIG. 21 is a front elevation view of an eighth exemplary embodiment of the refill indicator.

Referring now to FIGS. 21 and 22, an eighth exemplary embodiment of the refill indicator 722 is generally shown with like numerals, separated by a prefix of "7," identifying corresponding parts with the parts described above. In this embodiment, the refill indicator 722 is made as a thin sheet of a resilient material that can be curved with the application of force but that strains towards a planar shape. The refill indicator 722 is striped with three different colors (e.g., a red lower area 754*a*, a yellow middle area 754*b*, and a green upper area 754*c*) that extend horizontally. The upper area 754*c*, or top stripe, includes an instructions indicia 756 that explains to a user how to use the refill indicator 722. The instructions indicia 756 could read, for example, "Refill when you see [the color of the lower area, e.g., red]." However, any appropriate language may be employed. The lower area 754*a*, or bottom stripe, includes a refill indicia 758 that instructs the user to refill the medication in the bottle 720 when it can be read. For example, the refill indicia 758 could read "Refill Now." However, any appropriate language may be employed.

The refill indicator 722 is installed into the receptacle 726 by bending the refill indicator 722 into a curvature with a diameter that is less than the open top of the receptacle 726 and then inserting the refill indicator 722 into the interior of the receptacle 726. When a bottom edge of the refill indicator 722 contacts the bottom wall 730, the refill indicator 722 is released and automatically springs outwardly into contact with the sidewall 732. In this embodiment, the notification volume that is sized to hold no more than the notification pill count is the volume of the receptacle 726 below a line that separates the lower area 754*a* (bottom stripe) from the middle area 754*b* (middle stripe) of the refill indicator 722.

For the following discussion, the reference numerals of the first embodiment are used except where a feature that is unique to one or more of the other embodiments is being discussed. However, it should be appreciated that much of the following discussion may be applicable one or more other embodiments.

Another aspect of the present disclosure is related to a multi-bottle bottle system. Such a system may include a first bottle 20 and a second bottle 20 (or more bottles) that contain the same pills 24. Labels can be provided on both of the bottles 20 to indicate to the user which bottle 20 is to be taken first and which is to be taken second after the first bottle 20 has been emptied. The refill indicator 22 may only be provided in the second bottle or the first bottle 20 may include an indicator with indicia that informs the user to prepare the second bottle 20 because the first bottle 20 is running low.

In some embodiments, the refill indicator 22 may be installed into an empty bottle 20 in a pharmaceutical setting prior to any pills 24 being loaded into the bottle 20. The bottle 20, including the refill indicator 22 already contained inside, is then ultimately sold or otherwise delivered to the user with both the refill indicator 22 and a defined quantity of pills 24 contained therein. In other embodiments, the refill reminder 22 can be a standalone product that a user can purchase and install in the user's own medication bottle 20.

Figure 23:
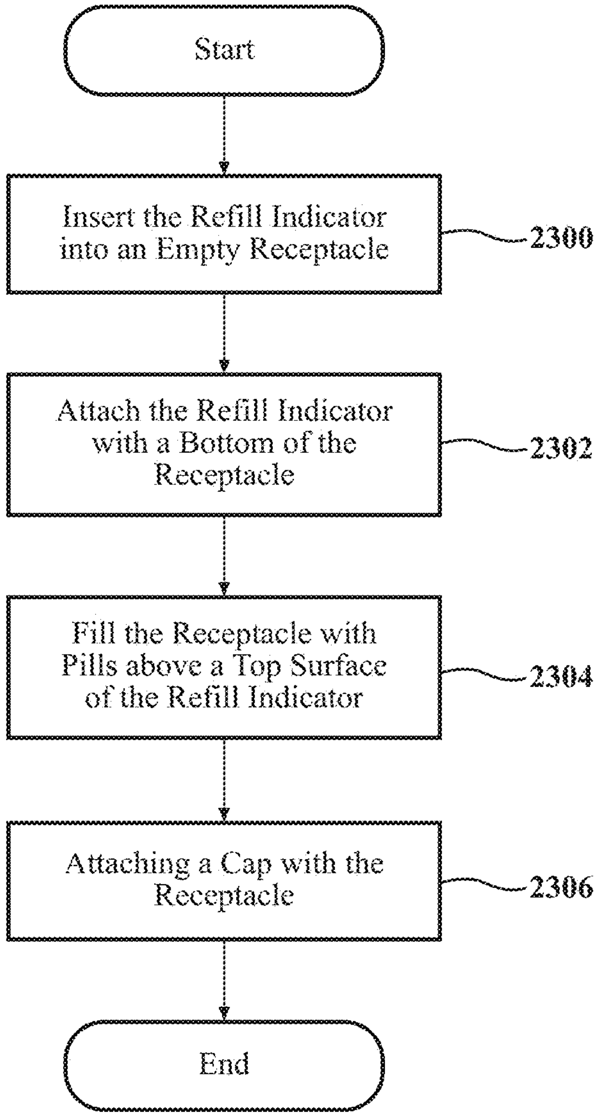
FIG. 23 is a flow chart depicting an exemplary method of filling a medication bottle.

Another aspect of the present disclosure is related to a method of filling a medication bottle 20. As shown in the flow chart of FIG. 23, the method includes the step 2300 of inserting a refill indicator 22 into an empty receptacle 26 of the bottle 20. In the exemplary embodiment, the method proceeds with the step 2302 of placing the refill indicator 22 against the bottom wall 30 of the receptacle 26. In some embodiments, the refill indicator 22 is fixedly attached with the bottom wall 30. In some other embodiments, the refill indicator 522 may not be fixedly attached with the bottom wall 530 but rather left to rest against the bottom wall 530. The method continues with the step 2304 of filling the receptacle with pills 24 until the pills 24 cover a top surface 38 of the refill indicator 22 such that the marking on the top surface 38 is not visible from above. The method proceeds with the step 2306 of attaching a cap 28 with the receptacle 26.

Figure 24:
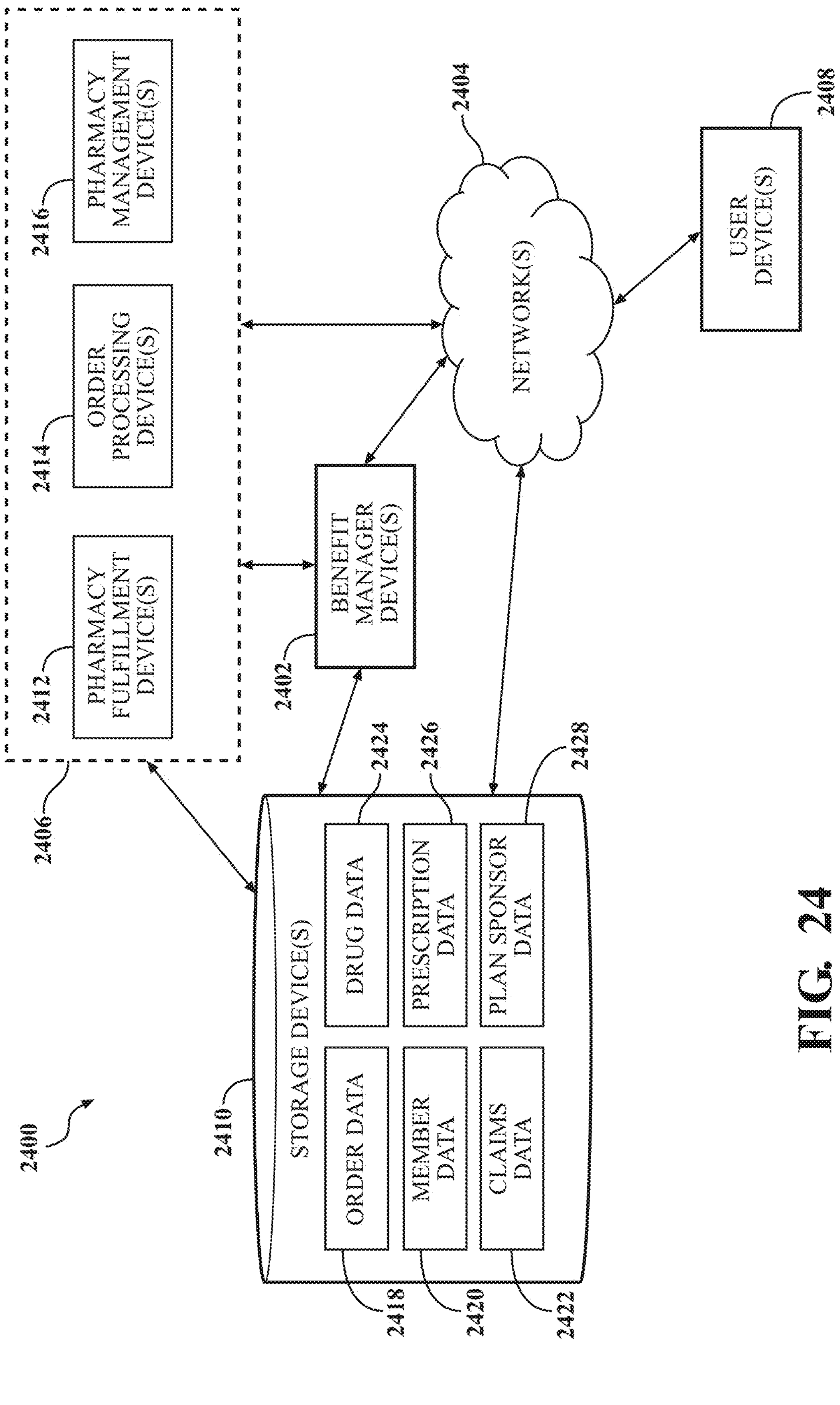
FIG. 24 is a schematic view depicting an exemplary pharmaceutical system.
Figure 25:
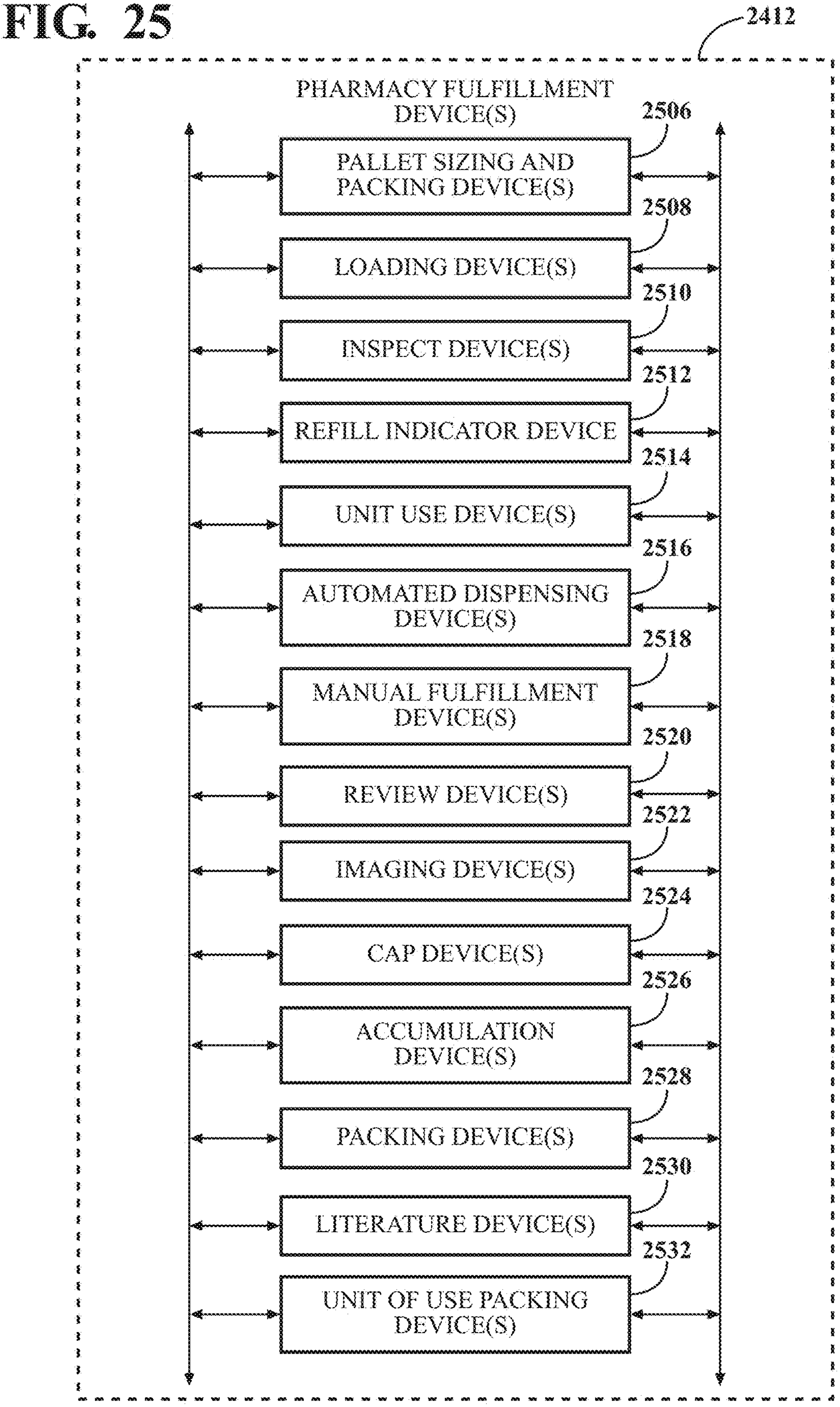
FIG. 25 is a schematic view depicting an exemplary pharmacy fulfillment device.
Figure 26:
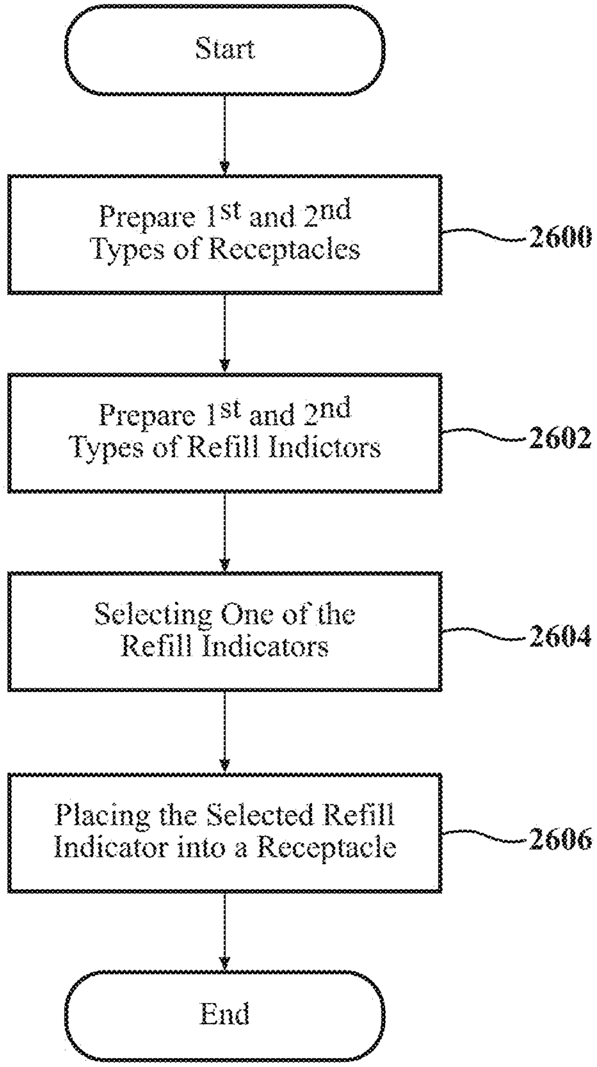
FIG. 26 is a flow chart depicting an exemplary method of placing refill indicators into medication bottles.

A plurality of refill indicators 22 be rapidly loaded into a plurality of medication bottles 20 within a pharmaceutical system 2400, such as the one shown in FIGS. 24 and 25. Specifically, FIG. 24 is a block diagram of an example implementation of a system 2400, according to an example embodiment. While the system 2400 is generally described as being deployed in a high-volume pharmacy or fulfillment center (e.g., a mail order pharmacy, a direct delivery pharmacy, an automated pharmacy, multiple package delivering center, and the like), the system 2400 and/or components thereof may otherwise be deployed (e.g., in a lower volume pharmacy). A high-volume pharmacy may be a pharmacy that is capable of filling prescriptions automatically, mechanically, manually, or a combination thereof. The system 2400 may include a benefit manager device 2402, a pharmacy device 2406, and a user device 2408, which may communicate with each other directly and/or over a network 2404. The system may also include a storage device 2410.

The benefit manager 2402 is a device operated by an entity that is at least partially responsible for creation and/or management of the pharmacy or drug benefit. While such an entity operating the benefit manager device 2402 is typically a pharmacy benefit manager (PBM), other entities may operate the benefit manager device 2402 either on behalf of themselves, the PBM, another entity, or other entities. For example, the benefit manager device 2402 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmaceutical vending machines or kiosks, and the like.

Some of the operations of the PBM that operates the benefit manager device 2402 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery from a mail order pharmacy location, which may be the high-volume pharmacy system 2400. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, by the high-volume pharmacy system 2400.

The member may have a copayment for the prescription drug that reflects an amount of money that the member is responsible to pay the pharmacy for the prescription drug. The money paid by the member to the pharmacy may come from personal funds of the member, a health savings account (HAS) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 2410 or determined by the benefit manager device 2402.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim. No copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 2402) may perform certain adjudication operations including verifying eligibility of the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 2402 to the pharmacy device 2406) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 2402 and/or an additional device.

Examples of the network 2404 include Mobile Communications (GSM) network, a code division multiple access (CDMA) network, 3$^{rd}$ Generation Partnership Project (3GPP), an Internet Protocol (IP) network, a Wireless Application Protocol (WAP) network, a WiFi network, or an IEEE 802.11 standards network, as well as various combinations thereof. The network 2404 may include an optical network. The network 2404 may be a local area network or a global communication network, such as the Internet. In some embodiments, the network 2404 may include a network dedicated to prescription e-orders, e.g., a prescribing network such as the electronic prescribing network operated by Surescripts of Arlington, Virginia.

Moreover, although the system shows a single network 2404, multiple networks can be used. The multiple networks may communicate in series with each other to link the devices 2402, 2406-2410 or in parallel to link the devices 2402, 2406-2410.

The pharmacy device 2406 may include an order processing device 2414, a pharmacy manager device 2416, and a pharmacy fulfillment device 2412 in communication with each other directly and/or over the network 2404.

The order processing device 2414 may receive information regarding filling prescriptions and may direct an order component to one or more than one of the devices of the pharmacy fulfillment device 2412 at a pharmacy. The pharmacy fulfillment device 2412 can also identify the refill indicator as an order component. The pharmacy fulfillment device 2412 may fulfill, dispense, aggregate, and/or pack the order components of the prescription drugs in accordance with one or more than one of the prescription orders directed by the order processing device 2414. The order processing device 2414 may be deployed in the system 2400, or may otherwise be used.

In general, the order processing device 2414 is a device located within or otherwise associated with the pharmacy to enable fulfillment of a prescription and dispensing prescription drugs by the pharmacy fulfilment device 2412. In some embodiments, the order processing device 2414 may be an external device separate from the pharmacy and communicate with other devices located within the pharmacy.

For example, the external order processing device 2414 may communicate with an internal order processing device 2414 and/or other devices located within the system 2400. In some embodiments, the external order processing device 2414 may have limited functionality (e.g., as operated by a patient requesting fulfillment of a prescription drug), while the internal pharmacy order processing device 2414 may have greater functionality (e.g., as operated by a pharmacist).

The order processing device 2414 may track the prescription order as it is fulfilled by the pharmacy fulfillment device 2412. The prescription order may include one or more than one prescription drugs to be filled by the pharmacy. The order processing device 2414 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 2414 may also track and/or schedule literature or paperwork associated with each prescription order or multiple prescription orders that are being shipped together.

The pharmacy management device 2416 may enable and/or facilitate management and operations in a pharmacy. For example, the pharmacy management device 2416 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 2414 may operate in combination with the pharmacy management device 2416.

In some embodiments, the pharmacy management device 2416 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 2416 may be utilized by the pharmacy to submit the claim to the PBM (e.g., through the benefit management device 2402) for adjudication.

In some embodiments, the pharmacy management device 2416 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 2402 may track prescription drug fulfillment and/or other information for patients that are not members or have not identified themselves as members, at the time (or in conjunction with the time) in which they seek to have a prescription filled at a pharmacy.

The pharmacy fulfillment devices 2412, the order processing device, and/or the pharmacy management device 2416 may include circuitry, a processor, a memory to store data and instructions, and communication functionality. These devices 2412-2416, in some embodiments are dedicated to performing processes, methods and/or instructions described herein. Other types of electronic devices specifically configured to implement with the processes, methods and/or instructions described herein may also be used.

In some embodiments, at least some functionality of the order processing device 2414 may be included in the pharmacy management device 2416 may include circuitry, a processor, a memory to store data and instructions, and communication functionality. These devices 2412-2416, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 2414 may be included in the pharmacy management device 2416. The order processing device 2414 may be in a client-server relationship with the pharmacy management device 2416, in a peer-to-peer relationship with the pharmacy management device 2416, or in a different type of relationship with the pharmacy management device 2416. The order processing device 2414 and/or the pharmacy management device 2416 may communicate directly (e.g., by utilizing a local storage) and/or through the network 2404 (e.g., by utilizing a cloud configuration or software as a service, etc.) with the storage 2410.

The user device 2408 is used by a device operator. The device operator may be a user (e.g., an employee, a contractor, a benefit member, a patient of the pharmacy, or the like) associated with the system 2400. Other device operators may also operate the user device 2408. In some embodiments, the user device 2408 may enable the device operator to attend to pharmacy operations in a convenient manner (e.g., remote from a pharmacy). In some embodiments, the user device 2408 may enable the device operator to receive information about pharmacy processes, prescription drug fulfillment status, and the like.

The user device 2408 may be a stand-alone device that solely provides at least some of the functionality of the methods and systems, or may be a multi-use device that has functionality outside off analysis of the methods and systems. Examples of the user device 2408 include a set-top box (STB), a receiver card, a mobile telephone, a personal digital assistant (PDA), a display device, a portable gaming unit, a computing system, and the like. Other devices, however, may also be used. In some embodiments, the computing system may include a mobile computing device. For example, the user device 2408 may include a mobile electronic device, such as an iPhone or iPad by Apple, Inc., and mobile electronic devices powered by Android by Google, Inc. The user device 2408 may also include other computing devices, such as desktop computing devices, notebook computing devices, netbook computing devices, gaming devices, and the like. Other types of electronic devices may also be used.

The storage device 2410 may include: a non-transitory storage (e.g., memory, hard disk, CD-ROM, and the like) in communication with the benefit manager device 2402, the pharmacy device 2406, and/or the user device 2408 directly and/or over the network 2404. The non-transitory storage may store order data 2418, member 2420, claims data 2422, drug data 2424, prescription data 2426, and/or plan sponsor 2428. Further, the system 2400 may include additional devices, which may communicate with each other directly or over the network 2404.

The order data 2418 may be related to a prescription order. The order data may include the type of the prescription drug (e.g., drug name and strength) and quantity of the prescription drug. The order data 2418 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 2418 may be used by the pharmacy to fulfill a pharmacy order.

In some embodiments, the order data 2418 includes verification information associated with fulfillment of the prescription in the pharmacy. For example, the order data 2418 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 2418.

The member data 2420 includes information regarding the members associated with the PBM. The information stored as member data 2420 may include personal information, personal health information, protected health information, fitness data, health data, web and mobile app activity, and the like. Examples of the member data 2420 include name, address, telephone number, e-mail address, prescription drug history, and the like. The member data 2420 can also include a member preference to include a refill indicator in the container. The member data 2420 may include a plan sponsor identifier that identifies the plan sponsor associated with the member and/or a member identifier that identifies the member to the plan sponsor. The member data 2420 may also include, by way of example, dispensation preferences such as type of label, type of cap, message preferences, language preferences, or the like.

The member data 2420 may be accessed by various devices in the pharmacy to obtain information utilized for fulfillment and shipping of prescription orders. In some embodiments, an external order processing device 2414 operated by or on behalf of a member may have access to at least a portion of the member data 2420 for review, verification, or other purposes.

In some embodiments, the member data 2420 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 2422 includes information regarding pharmacy claims adjusted by the PBM under a drug benefit program provided by the PBM for one, or more than one, plan sponsor. In general, the claims data 2422 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 2422. For example, medical claims, dental claims, wellness claims, or other types of health care-related claims for members may be stored as a portion of the claims data.

In some embodiments, the claims data 2422 includes claims that identify the members with whom the claims are associated. In some embodiments, the claims data 2422 includes claims that have been de-identified (e.g., associated with a unique identifier but not with a particular, identifiable member), aggregated, and/or otherwise processed.

The drug data 2424 may include drug name (e.g., technical name and/or common name), other names by which the drug is known by, active ingredients, an image of the drug (e.g., in pill form), and the like. The drug data 2424 may include information associated with a single medication or multiple medications. The drug data 2424 can also include a flag that a certain drug should be dispensed with a refill indicator as described herein.

The prescription data 2426 may include information regarding prescriptions that may be issued by prescribers on behalf of patients, who may be members of the pharmacy benefit plan, for example to be filled by a pharmacy. Examples of the prescription data 2426 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 2418 may be linked to associated member data 2420, claims data 2422, drug data 2424, and/or prescription data 2426.

The plan sponsor data 2428 includes information regarding the plan sponsors of the PBM. Examples of the plan sponsor data 2428 include company name, company address, contact name, contact telephone number, contact e-mail address, and the like.

FIG. 25 illustrates the pharmacy fulfillment device 2412, according to an example embodiment. The pharmacy fulfillment device 2412 may be used to process and fulfill prescriptions and prescription orders. After fulfillment, the fulfilled prescriptions are packed for shipping.

The pharmacy fulfillment device 2412 may include devices in communication with the benefit manager device, the order processing device 2414, and/or the non-transitory storage 2410, directly or over the network 2404. Specifically, the pharmacy fulfillment device 2412 may include pallet sizing and pucking device(s) 2506; loading device(s) 2508; inspect device(s) 2510; refill indicator device(s) 2512; unit of use device(s) 2514; automated dispensing device(s) 2516; manual fulfillment device(s) 2518; review device(s) 2520; imaging device(s) 2522; cap device(s) 2524; accumulation device(s) 2526; packing device(s) 2528; literature device(s) 2530; and unit of use packing device(s) 2532. Further, the pharmacy fulfillment device 2412 may include additional devices, which may communicate with each other directly or over the network 2404.

In some embodiments, operations performed by one or more of these devices 2506-2532 may be performed sequentially, or in parallel with the operations of devices as may be coordinated by the order processing device 2414. In some embodiments, the order processing device 2414 tracks a prescription with the pharmacy based on operations performed by one or more than one of the devices 2506-2532.

In some embodiments, the pharmacy fulfillment device 2412 may transport prescription drug containers, for example, between more than one of the devices 2506-2532 in a high-volume fulfillment center, by use of pallets. The pallet sizing and pucking device 2506 may configure pucks in a pallet. A pallet may be a transport structure for a number of prescription containers, and may include a number of cavities. A puck may be placed in one or more than one of the cavities in a pallet by the pallet sizing and pucking device 2506. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 2414 based on prescriptions that the order processing device 2414 decides to launch. The arrangement logic may be implemented directly in the pallet sizing and pucking device 2506. Once a prescription is set to be launched, a puck suitable for the appropriate size of container for that prescription may be positioned in a pallet by a robotic arm or pickers. The pallet sizing and pucking device 2506 may launch a pallet once pucks have been configured in the pallet.

The loading device 2508 may load prescription containers into the pucks on a pallet by a robotic arm, a pick and place mechanism, or the like. In one embodiment, the loading device 2508 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 2510 may verify that containers in a pallet are correctly labeled and in the correct spot on the pallet. The inspect device 2510 may scan the label on one or more than one container on the pallet. Labels of containers may be scanned or imaged in full or in part by the inspect device 2510. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 2418.

The refill indicator device 2512 is configured to insert a refill indicator 22 into one or more of the containers on the pallet. In some embodiments, the refill indicator device 2512 may include a plurality of differently shaped and/or differently sized refill indicators 22 and may select the appropriate one based on a unique combination of contents and the dosage instructions of the end user for that container. For example, on a single pallet a first type of refill indicator 22 may be placed in one container and a different, second type of refill indicator 22 may be placed in another container.

The unit of use device 2514 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 2514 may be packaged individually or collectively for shipping, or may be shipped in combination with other prescription drugs dispensed by other devices (e.g., in the high volume fulfillment center).

At least some of the operations of the devices 2506-2532 may be directed by the other processing device 2414. For example, the manual fulfillment device 2518, the review device 2520, the automated dispensing device 2516, the packing device 2528, and/or another device may receive instructions provided by the order processing device 2414.

The automated dispensing device 2516 may include one or more than one device that dispenses prescription drugs or pharmaceuticals into prescription containers in accordance with one or multiple prescription orders. In general, the automated dispensing device 2516 may include mechanical and electronic components with, in some embodiments, software and/or logic to facilitate pharmaceutical dispensing that would otherwise be performed in a manual fashion by a pharmacist and/or pharmacist technician. For example, the automated dispensing device 2516 may include high volume fillers (HVFs) that fill a number of prescription drug types at a rapid rate and blister pack machines that dispense and pack drugs into a blister pack. Prescription drugs dispensed by the automated dispensing devices 2516 may be packaged individually or collectively for shipping or may be shipped in combination with other prescription drugs dispensed by other devices in the high-volume fulfillment center.

The manual fulfillment device 2518 may provide for manual fulfillment of prescriptions. For example, the manual fulfillment device 2518 may receive or obtain a container and enable fulfillment of the container by a pharmacist or pharmacy technician. In some embodiments, the manual fulfillment device 2518 provides the filled container to another device in the pharmacy fulfillment devices 2512 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 2518 may be packaged individually or collectively for shipping or may be shipped in combination with other prescription drugs dispensed by other devices in the high-volume fulfillment center.

The review device 2520 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 2520 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 2522 may image containers prior to filling and/or after they have been filled with pharmaceuticals. The imaging device 2522 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 2414, and/or stored in the storage device 2410 as part of the order data 2418.

The cap device 2524 may be used to cap or otherwise seal a prescription container. In some embodiments, the cap device 2524 may secure a prescription container with a type of cap in accordance with a patient preference (e.g., a preference regarding child resistance, a preference regarding built-in adherence functionality, or the like), a plan sponsor preference, a prescriber preference, or the like. The cap device 2524 may also etch a message into the cap or otherwise associate a message into the cap, although this process may be performed by a different device in the high-volume fulfillment center.

The accumulation device 2526 accumulates various containers of prescription devices in a prescription order. The accumulation device 2526 may accumulate prescription containers from various devices or areas of the pharmacy. For example, the accumulation device 2526 may accumulate prescription containers from the unit of use device 2514, the automated dispensing device 2516, the manual fulfillment device 2518, and the review device 2520, at the high-volume fulfillment center. The accumulation device 2526 may be used to group the prescription containers prior to shipment to the member or otherwise.

The literature device 2530 prints, or otherwise generates, literature to include with prescription drug orders. The literature may be printed on multiple sheets of substrates, such as paper, coated paper, printable polymers, or combinations thereof. The literature printed by the literature device 2530 may include information required to accompany the prescription drugs included in a prescription order, relating to prescription drugs in the order, financial information associated with the order (e.g., an invoice or an account statement, or the like).

In some embodiments, the literature device 2530 folds or otherwise prepares the literature for inclusion with a prescription drug order (e.g., in a shipping container or the like). In some embodiments, the literature device 2530 that prints the literature may be separate from the literature device that prepares the literature for inclusion with a prescription order. The packing device 2528 packages a prescription order in preparation for shipping the order. The packing device 2528 may box, bag, or otherwise package the fulfilled prescription order for delivery. The packing device 2528 may be a wrap seal device. A wrap seal device deployed as the packing device 2528 may be a wrap seal device. A wrap seal device deployed as the packing device 2528 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 2528 may further place inserts (e.g., literature or other papers) into the packaging received from the literature device 2530 or otherwise. For example, bulk prescription orders may be shipped in a box, while other prescription orders may be shipped in a bag, which may be a wrap seal bag. The packing device 2528 may label the box or bag with an address and a recipient's name. The label may be printed and affixed to the bag or box, be printed directly onto the bag or box, or otherwise associated with the bag or box. The packing device 2528 may sort the box or bag for mailing in an efficient manner (e.g., sort by delivery address, sort by zip code, or the like). The packing device 2528 may label the box or bag with an address and a recipient's name. The label may be printed and affixed to the bag or box, be printed directly onto the bag or box, or otherwise associated with the bag or box. The packing device 2528 may sort the box or bag for mailing in an efficient manner (e.g., sort by delivery address, sort by zip code, or the like). The packing device 2528 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 2532 packages a unit of use prescription order in preparation for shipping the order.

The pharmacy fulfillment device 2412 in FIGS. 24 and 25 may include single devices 2506-2532 or multiple devices 2506-2532 (e.g., depending upon implementation in a pharmacy). The devices 2506-2532 may be the same type or model of device or may be different device types or models. When multiple devices are present, the multiple devices may be of the same device type or models or may be a different device type or model. The types of devices 2506-2532 shown in FIG. 25 are example devices. In other configurations of the system 2400, lesser, additional, or different types of devices may be included.

Moreover, multiple devices may share processing and/or memory resources. The devices 2506-2532 may be located in the same area or in different locations. For example, the devices 2506-2532 may be located in a building or a set of adjoining buildings. The devices 2506-2532 may be interconnected (e.g., by conveyors), networked, and/or otherwise in contact with one another or integrated with one another (e.g., at the high-volume fulfillment center). In addition, the functionality of a device may be split among a number of discrete devices and/or combined with other devices.

Another aspect of the present disclosure is a method of filling a plurality of medication containers, such as the bottles 20. At step 2600, the method includes the step of preparing a plurality of receptacles 26 of differing first and second types. At step 2602, the method proceeds with the step of providing a plurality of refill indicators 22 of differing first and second types. The method continues with the step 2604 of selecting one of the first and second types of refill indicators 22 with the refill indicator device 2512 to place into one of the receptacles 26 based on the size and shape of the receptacle 26; the size and shape of the pills 24 to be added to the receptacle 26; and a predetermined notification pill count. The method proceeds with the step 2606 of placing, with the refill indicator device 2512, the selected refill indicator 22 into the receptacle 26 and against a bottom wall 30 of the receptacle 26.

The above aspects of the disclosure describe a medication container; however, the present disclosure is applicable to containers with other contents beyond medications and is applicable to fluid or semi-fluid contents.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore, specify the presence of stated features, integers, steps, operations, elements, and/or components, but do not preclude the presence or addition of one or more other features, integers, steps, operations, elements, components, and/or groups thereof. The method steps, processes, and operations described herein are not to be constructed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached with," "coupled to," etc. another element or layer, it may be directly on, engaged, connected, attached, coupled, etc. to the other element or layer or intervening elements or layers may be present. In contrast, when the connection is referred to as being direct, there may be no intervening elements or layers present. Other words used to describe the relationship should be interpreted in like fashion. As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another element, component, region, layer, and section. Terms such as "first," "second," and other numerical terms when used herein do not imply a sequence or order unless clearly indicated by the context. Thus, a first element, component, region, layer, or section discussed above could be termed a second element, component, region, layer, or section without departing from the teachings of the example embodiments.

Spatially relative terms, such as "inner," "outer," "beneath," "below," "lower," "above," "upper," "top," "bottom," and the like may be used herein for ease of description to describe one element or feature's relationship to another element or feature as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Obviously, many modifications and variations of the present disclosure are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A medication container, comprising:

a receptacle having a bottom wall and an open top and at least one side wall and an interior;

a refill indicator disposed in the interior of the receptacle and in contact with the bottom wall extending towards the open top, the refill indicator having an annular shape and having an inner wall that surrounds a notification volume;

the bottom wall and the at least one side wall and the refill indicator together defining a single pill chamber that can hold pills within the receptacle for both storage and removal;

a plurality of pills disposed in the single pill chamber within the receptacle, a pill count of the plurality of pills being greater than a non-zero predetermined notification pill count that can fit in the notification volume such that at least one of the plurality of pills at least partially covers the top surface of the refill indicator;

the top surface being angled downwardly towards the inner wall to guide pills on the top surface towards the notification volume;

wherein the predetermined notification pill count is a predetermined supply of pills for a patient so that the patient can obtain more pills prior to the pill count reaching zero; and wherein the refill indicator has a cut to allow the refill indicator to be compressed when it is inserted through the open top of the receptacle.

2. The medication container as set forth in claim 1, wherein the refill indicator is made as a separate piece from the receptacle.

3. The medication container as set forth in claim 1, wherein the refill indicator has an outer wall that is biased against a sidewall of the receptacle.

4. The medication container as set forth in claim 1, wherein the notification volume has a cylindrical shape.

5. The medication container as set forth in claim 1, wherein the refill indicator is spaced inwardly of a sidewall of the receptacle.

6. A medication container, comprising:

a receptacle having a bottom wall and an open top and at least one side wall and an interior;

a refill indicator disposed in the interior of the receptacle and in contact with the bottom wall extending towards the open top, the refill indicator having an annular shape and having an inner wall that surrounds a notification volume;

the bottom wall and the at least one side wall and the refill indicator together defining a single pill chamber that can hold pills within the receptacle for both storage and removal;

a plurality of pills disposed in the single pill chamber within the receptacle, a pill count of the plurality of pills being greater than a non-zero predetermined notification pill count that can fit in the notification volume such that at least one of the plurality of pills at least partially covers the top surface of the refill indicator;

the top surface being angled downwardly towards the inner wall to guide pills on the top surface towards the notification volume;

wherein the predetermined notification pill count is a predetermined supply of pills for a patient so that the patient can obtain more pills prior to the pill count reaching zero;

wherein the refill indicator has a cut to allow the refill indicator to be compressed when it is inserted through the open top of the receptacle;

wherein the refill indicator is made as a separate piece from the receptacle; and wherein the refill indicator has an outer wall that is biased against a sidewall of the receptacle.

7. The medication container as set forth in claim 6, wherein the notification volume has a cylindrical shape.

8. The medication container as set forth in claim 6, wherein the refill indicator is spaced inwardly of a sidewall of the receptacle.

9. The medication container of claim 1, wherein the bottom wall is circular and the at least one side wall is cylindrical.

10. The medication container of claim 9, wherein the bottom wall and the at least one side wall are monolithic and a top of the at least one side wall is engageable by a cap to close the interior of the receptacle.

11. The medication container of claim 6, wherein the bottom wall is circular and the at least one side wall is cylindrical.

12. The medication container of claim 11, wherein the bottom wall and the at least one side wall are monolithic and a top of the at least one side wall is engageable by a cap to close the interior of the receptacle.

* * * * *